United States Patent
Nguyen et al.

(10) Patent No.: US 10,191,889 B2
(45) Date of Patent: Jan. 29, 2019

(54) SYSTEMS, APPARATUSES AND METHODS FOR GENERATING A USER INTERFACE BY PERFORMING COMPUTER VISION AND OPTICAL CHARACTER RECOGNITION ON A GRAPHICAL REPRESENTATION

(71) Applicant: Board of Regents, The University of Texas System, Austin, TX (US)

(72) Inventors: Tuan Anh Nguyen, Holbrook, NY (US); Christoph Csallner, Southlake, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 75 days.

(21) Appl. No.: 14/812,558

(22) Filed: Jul. 29, 2015

(65) Prior Publication Data

US 2016/0034441 A1   Feb. 4, 2016

Related U.S. Application Data

(60) Provisional application No. 62/030,112, filed on Jul. 29, 2014.

(51) Int. Cl.
*G06F 17/21* (2006.01)
*G06F 17/27* (2006.01)
*G06F 17/22* (2006.01)

(52) U.S. Cl.
CPC ........ *G06F 17/211* (2013.01); *G06F 17/2241* (2013.01); *G06F 17/2765* (2013.01)

(58) Field of Classification Search
CPC .............. G06F 17/211; G06F 17/2229; G06F 17/2247; G06F 17/2264; G06F 17/30056
USPC ................ 715/202, 234, 243, 247, 248, 249
See application file for complete search history.

(56) References Cited

U.S. PATENT DOCUMENTS

| | | | |
|---|---|---|---|
| 5,801,842 A * | 9/1998 | Medina | H04N 1/33323 358/434 |
| 7,120,876 B2 * | 10/2006 | Washington | G06F 8/34 715/763 |
| 8,788,935 B1 * | 7/2014 | Hirsch | G06F 17/2247 715/234 |
| 8,812,946 B1 * | 8/2014 | Kopylov | G06F 17/21 715/202 |
| 9,448,908 B2 * | 9/2016 | Carmi | G06F 11/3438 |
| 2004/0158676 A1 * | 8/2004 | Kasmirsky | G06F 17/30017 711/117 |
| 2008/0243898 A1 * | 10/2008 | Gormish | G06F 21/64 |

(Continued)

OTHER PUBLICATIONS

"Computer vision;" Microsoft Computer Dictionary; May 1, 2002; Microsoft Press; Fifth Edition; p. 151.*

(Continued)

*Primary Examiner* — Andrew R Dyer
(74) *Attorney, Agent, or Firm* — Thomas | Horstemeyer, LLP

(57) ABSTRACT

Systems, apparatuses and methods for generating a graphical user interface (GUI) conforming to a graphical representation employ computer vision, optical character recognition, and other techniques to generate a structure of the GUI as a view hierarchy. A development project with source code and resource files is created to generate an application having the GUI. The application and GUI are applicable to mobile and other platforms using various operating systems, such as Android®, iOS®, and others.

32 Claims, 13 Drawing Sheets

(56) References Cited

U.S. PATENT DOCUMENTS

| | | | | |
|---|---|---|---|---|
| 2010/0074525 | A1* | 3/2010 | Drory | G06K 9/00442 382/176 |
| 2011/0126158 | A1* | 5/2011 | Fogarty | G06F 3/0481 715/835 |

OTHER PUBLICATIONS

"How OCR Works: Let's Take Things Step by Step, Shall We?;" Oct. 15, 2014; how-ocr-works.com; p. 1.*

"How OCR Works: B is for Binarize;" Nov. 15, 2014; how-ocr-works.com; p. 1.*

Gary Bradski and Adrian Kaehler; Learning OpenCV; 2008; O'Reilly Media, Inc., 571 Pages.*

Giovanni Becce, Leonardo Mariani, Oliviero Riganelli, Mauro Santoro, "Extracting Widget Descriptions from GUIs," FASE'12 Proceedings of the 15th international conference on Fundamental Approaches to Software Engineering, 2012, pp. 347-361, Springer-Verlag, Berlin.

Mario Luca Bernardi, Giuseppe Antonio Di Lucca, Damiano Distante, "The RE-UWA Approach to Recover User Centered Conceptual Models from Web Applications," International Journal on Software Tools for Technology Transfer, 2009, pp. 485-501, 11(6).

Mario Luca Bernardi, Giuseppe A. Di Lucca, Damiano Distante, Francesco Mazzone, "A Semi-Automated Approach to Redesign Web Applications with UWA," 2010, 10 pgs., ACM.

Tsung-Hsiang Chang, Tom Yeh, Rob Miller, "Associating the Visual Representation of User Interfaces with their Internal Structures and Metadata," UIST '11 Proceedings of the 24th annual ACM symposium on User interface software and technology, 2011, pp. 245-256, ACM, New York.

Alex Q. Chen, Simon Harper, Darren Lunn, Andrew Brown, "Widget Identification: A High-Level Approach to Accessiblity," World Wide Web, 2013 (published online 2012), 19 pgs., 16(1), Springer Netherlands.

Morgan Dixon, James Fogarty, "Prefab: Implementing Advanced Behaviors Using Pixel-Based Reverse Engineering of Interface Structure," CHI '10 Proceedings of the SIGCHI Conference on Human Factors in Computing Systems, 2010, pp. 1525-1534, ACM, New York.

Morgan Dixon, Daniel Leventhal, James Fogarty, "Content and Hierarchy in Pixel-Based Methods for Reverse Engineering Interface Structure," CHI '11 Proceedings of the SIGCHI Conference on Human Factors in Computing Systems, 2011, pp. 969-978, ACM New York.

Krzysztof Z. Gajos, Daniel S. Weld, Jacob O. Wobbrock, "Automatically Generating Personalized User Interfaces with SUPPLE," Artificial Intelligence, 2010, 50 pgs., 174(12-13).

ATIF Memon, Ishan Banerjee, Bao N. Nguyen, Bryan Robbins, "The First Decade of GUI Ripping: Extensions, Applications, and Broader Impacts," Proceedings of the 20th Working Conference on Reverse Engineering (WCRE), 2013, pp. 11-20, IEEE.

Xiaojun Meng, Shengdong Zhao, Yongfeng Huang, Zhongyuan Zhang, James R. Eagan, Ramanathan Subramanian, "WADE: Simplified GUI Add-on Development for Third-party Software," CHI '14 Proceedings of the SIGCHI Conference on Human Factors in Computing Systems, Apr. 26, 2014, pp. 2221-2230, ACM, New York.

Oscar Sanchez Ramon, Jesus Sanchez Cuadrado, Jesus Garcia Molina, "Model-Driven Reverse Engineering of Legacy Graphical User Interfaces," ASE '10 Proceedings of the IEEE/ACM international conference on Automated software engineering, 2010, pp. 147-150, ACM, New York.

Eeshan Shah, Eli, Tilevich, "Reverse-Engineering User Interfaces to Facilitate Porting to and across Mobile Devices and Platforms," SPLASH '11 Workshops: Proceedings of the compilation of the co-located workshops on DSM'11, TMC'11, AGERE! 2011, AOOPES'11, NEAT'11, & VMIL'11, 2011, pp. 255-260, ACM, New York.

Robert St.Amant, Mark O. Riedl, Frank E. Ritter, Andrew Reifers, "Image Processing in Cognitive Models with Segman," Proceedings of HCI International, 2005, 10 pages, vol. 4—Theories Models and Processes in HCI.

Jean Vanderdonckt, Laurent Bouillon, Nathalie Souchon, "Flexible Reverse Engineering of Web Pages with VAQUISTA," WCRE '01 Proceedings of the Eighth Working Conference on Reverse Engineering (WCRE'01), 2001, 8 pgs., IEEE Computer Society, Washington, DC.

Tsung-Hsiang Chang, Tom Yeh, Robert C. Miller, "GUI Testing Using Computer Vision," CHI '10 Proceedings of the SIGCHI Conference on Human Factors in Computing Systems, 2010, pp. 1535-1544, ACM, New York.

Tom Yeh, Tsung-Hsiang Chang, Robert C. Miller, "Sikuli: Using GUI Screenshots for Search and Automation," UIST '09 Proceedings of the 22nd annual ACM symposium on User interface software and technology, 2009, pp. 183-192, ACM, New York.

* cited by examiner

SYSTEMS, APPARATUSES AND METHODS FOR GENERATING A USER INTERFACE BY PERFORMING COMPUTER VISION AND OPTICAL CHARACTER RECOGNITION ON A GRAPHICAL REPRESENTATION

CROSS-REFERENCE TO RELATED APPLICATIONS

This application claims the benefit of the filing date of U.S. Provisional Patent Application No. 62/030,112, filed on Jul. 29, 2014, by the inventors of this application, and incorporated herein by reference.

STATEMENT REGARDING FEDERALLY SPONSORED RESEARCH

This invention is based in part upon work supported by the National Academy of Sciences under Grant No: 1117369.

FIELD OF THE INVENTION

This disclosure relates generally to a systems, apparatuses and methods for generating a user interface. More particularly, this disclosure relates to generating, from a graphical (visual) representation of a graphical user interface, a graphical user interface for a mobile application, including code for the graphical user interface.

BACKGROUND

Developing the user interface (UI) code of mobile applications is cumbersome and expensive in practice. The development process may begin with designers and graphic artists creating conceptual drawings of screenshots, either hand sketched using paper and pencil (and subsequently scanned in) or by using a graphic design tool, such as ADOBE® PHOTOSHOP® or another computer-based tool. In either case, different types of screen objects (e.g., text, image, etc.) need to be identified as such from the pixels used by a display device to portray the initial conceptual renderings. Moreover, the hierarchical structure of screen elements underlying the bitmap images needs to be inferred. This is particularly complex and difficult in the context of mobile applications because mobile UIs often deviate from their platforms' standard UI components and rather include novel and customized UI elements and custom positioning and grouping. Also, this process of conversion from conceptual drawing to UI code must often be carried out many times during the lifetime of a mobile application because mobile UIs often undergo many revisions both in initial software development and thereafter when in commercial use. This conversion process is not only labor-intensive and costly, but also error-prone as bugs are often created, which must be corrected. While this conversion process may be thought of as 'forward engineering', a similar reverse engineering scenario exists. That is, a UI developer may have access only to screenshots of a mobile application, not to any software such as the source code. In such case it may be desired to generate the UI code from the screenshots, for use in the same or a different environment, e.g., platform, operating system (OS), device/screen size/form factor. As will be understood, the conversion process described above arises in the context of computer and mobile devices having displays and also from the diversity of computer and mobile platforms and the like.

SUMMARY

The present disclosure provides improved systems, apparatuses, and methods for generating a user interface (UI), which improve upon aspects described above and mitigate difficulties therein.

According to a first aspect of the invention, there is provided a method comprising: performing a computer vision (CV) process on a graphical representation of an initial UI to yield a CV output; performing an optical character recognition (OCR) process on the graphical representation of the initial UI to yield an OCR output; and merging the CV output and the OCR output to yield a merge output, wherein the merge output comprises a view hierarchy representing a structure of a final UI that conforms to the graphical representation of the initial UI.

According to a second aspect of the invention, there is provided a method comprising: identifying candidate atomic UI elements in a graphical representation of an initial UI; identifying candidate text in the graphical representation of the initial UI; and merging the identified candidate atomic UI elements and the identified candidate text to yield a merge output, wherein the merge output comprises a view hierarchy representing a structure of a final UI that conforms to the graphical representation of the initial UI.

According to a third aspect of the invention, there is provided a computer system comprising: a CV component configured for identifying atomic UI elements in a graphical representation of an initial UI; an OCR component configured for identifying text in the graphical representation of the initial UI; and a UI generation component configured for merging identified candidate text and vision boxes associated with identified atomic UI elements to produce a merge output. The merge output comprises a view hierarchy representing a structure of a final UI that conforms to the graphical representation of the initial UI.

Computer-readable media comprising instructions for causing a processor-based device to perform methods according to the first and second aspects described above are also disclosed.

Other aspects of the embodiments described herein will become apparent from the following description and the accompanying drawings, illustrating the principles of the embodiments by way of example only.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

NOTATION AND NOMENCLATURE

Figure 1:
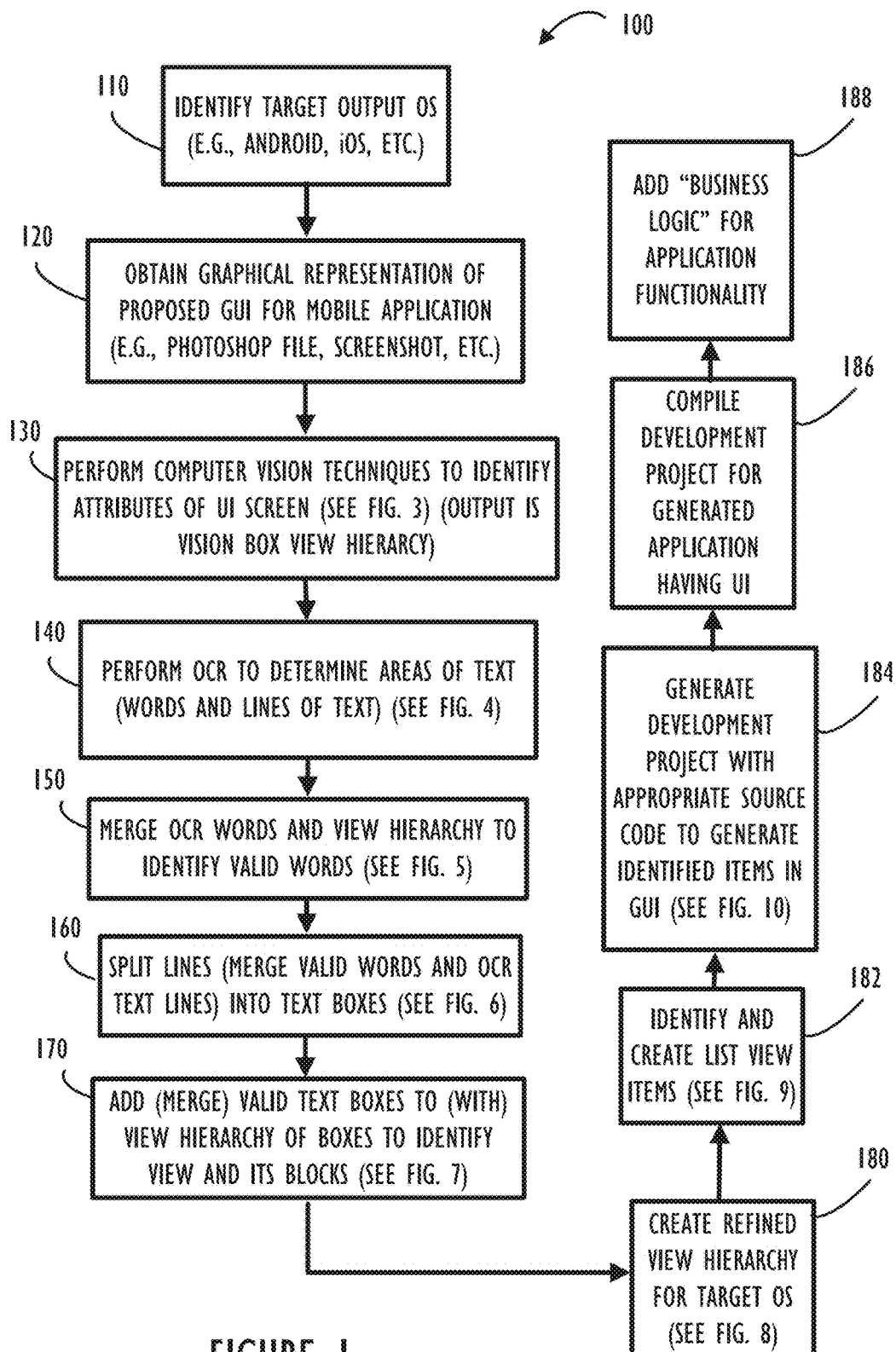
FIG. 1 is a flowchart illustrating a process of generating an application having a graphical user interface (GUI) conforming to an original input graphical representation, according to some embodiments of this disclosure.

Certain terms are used throughout the following description and claims to refer to particular system components and configurations. As one skilled in the art will appreciate, the same component may be referred to by different names. This document does not intend to distinguish between components that differ in name but not function. In the following discussion and in the claims, the terms "including" and "comprising" are used in an open-ended fashion, and thus should be interpreted to mean "including, but not limited to . . . ."

DETAILED DESCRIPTION OF DISCLOSED EMBODIMENTS

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness. The same or similar parts may be marked with the same or similar reference numerals.

While various embodiments are described herein, it should be appreciated that the present invention encompasses many inventive concepts that may be embodied in a wide variety of contexts. The following detailed description of exemplary embodiments, read in conjunction with the accompanying drawings, is merely illustrative and is not to be taken as limiting the scope of the invention, as it would be impossible or impractical to include all of the possible embodiments and contexts of the invention in this disclosure. Upon reading this disclosure, many alternative embodiments of the present invention will be apparent to persons of ordinary skill in the art. The scope of the invention is defined by the appended claims and equivalents thereof.

Illustrative embodiments of the invention are described below. In the interest of clarity, not all features of an actual implementation for all embodiments are necessarily described in this specification. In the development of any such actual embodiment, numerous implementation-specific decisions may need to be made to achieve the design-specific goals, which may vary from one implementation to another. It will be appreciated that such a development effort, while possibly complex and time-consuming, would nevertheless be a routine undertaking for persons of ordinary skill in the art having the benefit of this disclosure.

According to embodiments of the present invention, the user interface (UI) portion of the source code of a mobile application may be automatically inferred from screenshots or conceptual drawings of the UI. More specifically, on a given input bitmap, UI elements, such as images, text, containers, lists, etc. may be identified using computer vision and optical character recognition (OCR) techniques. Further, a suitable UI hierarchy may be inferred and the results may be exported as source code that is ready for compilation and execution. The generated UI may closely mimic the original UI conceptual drawings or screenshots.

Thus, a graphical (i.e., visual) representation (e.g., conceptual drawing(s) or screenshot(s)) of a UI is provided as input. From this input, code for producing such a UI is automatically generated. The process may be performed in the context of either forward or reverse engineering.

In addition, a target mobile operating system (OS), that is, an OS on which the UI is to be run, may be selected. The code may thus be generated for the target OS.

The input graphical representation may be created using ADOBE® PHOTOSHOP® or another (e.g., computer-implemented) graphic design tool, may be a screen shot, may be captured from an application running on a mobile device (whether operating on an OS that is the same as or different from the target OS), or may be created or captured in another way. The application may be a mobile application, a web application's mobile interface, or another kind of application.

The generated code may be used to populate a development environment for a mobile application that is to have a graphical UI (GUI) conforming to the input graphical representation. The generated code may subsequently be compiled to produce an application including the conforming GUI. The development environment may further allow a developer to incorporate business logic into the populated development environment to produce a fully functional application. Because the GUI portion of the application is automatically generated, the time, effort (and human involvement generally), and errors typically involved in development of a mobile application may be reduced. Thus, disclosed embodiments may generate a functioning mobile application (with or without business logic) from a graphical representation of a user interface.

In one example scenario, a designer produces a screen design bitmap. Working UI code may be inferred from this bitmap, by operations that may be understood as mimicking the steps a programmer would take. Computer vision and character recognition techniques may be used to 'reason' about (analyze) the screen bitmap. Operations may be performed to group related pixels into text items or images, lines of text into text boxes, related items into containers, and repeated elements into list elements. Non-standard UI components such as arbitrarily shaped items (e.g., the round images seen in element 205 in FIG. 2) and non-standard lists may be identified (the latter, e.g., using a special horizontal separator).

Continuing this example scenario, several XML files may be generated to capture the screen's static properties. In this example, the main XML file declares and positions the elements of the top and bottom rows including icons and their labels. This file also contains a list view for the bulk of the screen content. The layout of each list entry is defined by the Listing 1 XML file (shown below). For example, it positions a contact's image and aligns it with the top left of its parent (alignParentTop, alignParentLeft) (e.g., with regard to element 205 in FIG. 2). Operations are performed that recognize aligned text blocks such as the sender's name and message (e.g., in element 205 in FIG. 2), group them into a (nested) layout container (Listing 1), and export the recognized text fragments as an ANDROID® resource file. ("ANDROID" is a registered trademark of Google, Inc.) At application runtime the list entries are added by the Listing 2 JAVA® source code (shown below), which has also been generated. ("JAVA" is a trademark or registered trademark of the Oracle Corporation.)

---

Listing 1. Generated layout for each list entry shown in element 205 in FIG. 2. Details are shown for only the left part of a list entry.

```
<RelativeLayout<!-- List Entry ... -->>
   <ImageView<!-- Horizontal Bar ... --> />
   <ImageView android:id="@+id/ImageView_1"
      android:layout_width="59dip"
      android:layout_height="61dip"
      android:layout_marginLeft="5dip"
      android:layout_marginTop="0dip"
      android:src="@drawable/img_9"
      android:scaleType="fitXY"
      android:layout_alignParentTop="true"/
      android:layout_alignParentLeft="true"/>
   <RelativeLayout<!-- Nested: Text Block (center) ... -->>
      <TextView<!-- Sender name ... --> />
      <TextView<!-- Message ... --> />
   </RelativeLayout>
   <TextView<!-- Message date (right) ... --> />
</RelativeLayout>
```

---

Listing 2. Generated Android (i.e., Java) source code that populates Listing 1 list entries at application runtime.

```
public class MainActivity extends Activity {
   //..
   private void addListView0( ) {
      ListView v = (ListView) findViewById(R.id.ListView_0);
      final ArrayList<ListI>values = new ArrayList<ListI>( );
      values.add(new ListI(R.drawable.img_4, R.drawable.img_9, R.
         string.string_0, R.string.string_1, R.string.string_2));
      //..
   }
}
//..
```

---

The generated UI code and layout definitions can be compiled with standard ANDROID® development tools. Moreover, the code is similar to how a professional developer would implement the screen. For example, the generated code uses the appropriate kinds of layout container such as RelativeLayout for the list entries. A RelativeLayout can eliminate the need for some nested containers and thus keep the layout hierarchy relatively flat, which improves rendering performance at application runtime.

The preceding example scenario will be more fully understood in view of the rest of this disclosure.

Background information on technical areas, techniques, concepts, and the like bearing on this disclosure will now be presented to facilitate understanding of this disclosure.

The first area of background pertains to GUI programming and mobile phone GUIs, including the GUI view hierarchy and declarative GUI programming.

The GUI of many modern desktop and mobile platforms is comprised of elements referred to as "views" and structured as a view hierarchy. A view represents a rectangular area of the device display and is responsible for what appears in that area and for handling events that take place within that area (e.g., a touch event on a touch screen). A view can be composite or not. A composite view comprises a parent view (also referred to as a container view or a container) that is capable of containing other views (known as child views) within it. That is, a child view is rendered on top of its parent view and thus is displayed within the bounds of the parent view and over (occupying) a portion (or all) of the parent view's area.

A view hierarchy may be understood as a tree structure (tree data structure), comprising a set of linked nodes. Such a structure has a single root node, the (logically) topmost node. The root node has one or more children nodes but no parent node. The children of the root node may have children nodes, and so on. A node with no children is referred to as a leaf node.

Thus, in a view hierarchy, the root node, or root view, represents the application's entire space on the screen. A container node, or container view, as discussed, has one or more child views within it, each child typically occupying a rectangular sub-region of its parent. A leaf node, or leaf view, does not have child views within it. Examples of leaf views would be images, buttons, text, etc.

In a view hierarchy, each view can have its own parameters such as height, width, background color, and position. A view can be positioned relative to the root or relative to other views such as its parent or siblings.

In rendering a view hierarchy on a screen, a parent is drawn before its children and, as mentioned, a child hides parts of its parent. Siblings are drawn in the order in which they are defined. Another way of describing this is to state that when a UI is rendered (displayed), the view hierarchy (or tree) is walked (or traversed) starting at the root view (node) and working down the tree as it renders each view. (A tree structure is generally illustrated with the root node at the top and subsequent generations of children at respective subsequent lower levels. "Walking" or "traversing" the tree means to step through the nodes of the tree by means of the connections between parent and child nodes. A walk or traversal in which each parent node is traversed before its children is called a "pre-order" walk, while a walk in which the children are traversed before their respective parents are traversed is called a "post-order" walk.) A best practice is to minimize rendering time by keeping hierarchies flat and avoiding view overlap.

Given the relatively small mobile phone screen size, mobile platforms make it easy to hide their default screen elements such as the IOS® title bar or the ANDROID® navigation bar. Applications often use this feature to maximize screen size. ("IOS" is a registered trademark of Cisco Systems, Inc.)

To define basic GUI aspects, modern platforms provide two alternatives. The traditional desktop approach is construction through regular program code. The now widely recommended alternative is declarative, e.g., via XML layout definition files in ANDROID®. Advanced GUI aspects are then defined programmatically, which typically leads to a combination of code and layout declaration files.

The next area of background pertains to ANDROID® as an example GUI framework. The ANDROID® standard libraries define various GUI containers ("layout containers") and leaf nodes ("widgets"). The following are examples of the containers: LinearLayout, which places its children in a single row or column; RelativeLayout, which positions children relative to itself or each other; FrameLayout, which typically has a single child; ScrollView, which is a scrollable FrameLayout; and ListView, which lays out children as a vertical scrollable list. The following are examples of the widgets: TextView, which is read-only text; ImageView, which is a bitmap; Button, which is a device-specific text button; View, which is a generic view; EditText, which is editable text; and Image-Button, which is a device-independent button that shows an image. Besides the above, the ANDROID® library documentation currently lists some additional two dozen widgets and some three dozen layout containers.

The next area of background pertains to optical character recognition (OCR). To infer UI code that closely reproduces the input conceptual drawing, it is desirable to distinguish text from images and capture the text as precisely as possible. Research in OCR has produced specialized methods for recognizing various kinds of text such as text in different sizes, fonts, and orientation, as well as handwritten text. Generally, it is easier to recognize text online (while it is being written) than offline. Similarly, it is easier to recognize print than handwriting.

Existing OCR tools perform relatively well if the input consists of mostly text. A good example is single-column text with few images. Current OCR tools perform worse if the text density is lower and text is arranged more freely and combined with images. A good, representative OCR tool is the powerful and widely used open-source OCR engine Tesseract, which, for instance, MATHEMATICA® 9 uses to recognize text. In the closely related task of segmenting pages (for example, to distinguish images and individual text columns), Tesseract performs on par with commercial tools. However, the limitations of such a powerful OCR tool on complex inputs become apparent when subjecting it to screenshots or conceptual UI drawings. For example, when Tesseract is given a conceptual drawing as input and attempts to detect text at various granularity levels, e.g., words, lines, blocks, and paragraphs, Tesseract may find all the words but may also classify non-words (e.g., images) as words. In general, for the domain of conceptual screen drawings and screenshots Tesseract's precision and recall are often both below one in all granularity levels. Thus, even a powerful OCR tool may miss some words and classify some non-text as words.

The next area of background pertains to computer vision. Computer vision (or machine vision) may be understood as referring to methods by which computers 'understand' content of an image as that image would be seen and its content understood by a human being. For example, a robot would use, in part, computer vision techniques to attempt to identify and distinguish real world objects.

Computer vision techniques can quickly detect features such as corners and edges in two-dimensional images. Computer vision has therefore been applied to diverse tasks such as recognizing faces in two-dimensional images and allowing self-driving cars to detect the edge of the road.

The next area of background pertains to edge detection. Edge detection refers to image processing techniques that detect edges in images. They may accomplish this by marking or identifying the points in a digital image at which the luminous intensity changes sharply. These points would indicate the presence of an edge. In the context of this disclosure, edges of interest may be, for example, edges of a UI button or edges of an icon image.

The next area of background pertains to merging. Merging of information may be understood as taking two or more inputs and producing a single output by combining or integrating the two inputs. In some cases, the input data may not be changed; in other cases, it may be changed. In some cases, the output is something that is not present or not available in the multiple input streams.

The next area of background pertains to source code generation, GUI code, and business logic.

Source code generation may be understood as the activity of generating source code for a program or function using an outside input not in the form of a computer program. The source code generation process is typically based on a model such as a template that defines rules to follow, and it may employ a programming tool such as a template processor or an integrated development environment (IDE).

GUI code refers to source code and resources required to implement a GUI portion of a mobile application, i.e., a portion that effects graphical (visual) displays via which a user interacts with the application. The GUI may typically contain push buttons, icons, list items, radio buttons, etc. to allow for the GUI to provide necessary inputs (provided by the user) to the application.

Business logic of an application refers to the portion of code that provides the underlying functionality of the application. The business logic portion of the application knows how to process inputs and interaction events provided by the UI portion of the application. As used in this disclosure, the business logic portion of the application refers to all portions of the mobile application that are distinct from the (G)UI portion.

Although the embodiments and examples discussed herein often pertain to mobile applications and to ANDROID®, the disclosure is also applicable, mutatis mutandis, to non-mobile applications, and to IOS®, WINDOWS® Phone Operating System, and other mobile and non-mobile OSs. ("WINDOWS" is a registered trademark of Microsoft, Inc.) One of ordinary skill in the art will understand how to apply the teachings herein to such other applications and OSs.

An overview of some disclosed embodiments will now be described with reference to FIGS. 1 and 2. These embodiments will be elaborated on in further detail below with reference to FIGS. 3-10.

FIG. 1 is a flow chart illustrating a process 100 of generating, for a particular OS, a mobile application, or a GUI portion thereof, including GUI code and business logic, according to some disclosed embodiments. FIG. 2 illustrates diagram 200 showing a high level overview of a process such as process 100 and covering some aspects of process 100. This overview provided with reference to FIGS. 1 and 2 will be more fully understood when considered together with the remainder of this disclosure.

Figure 2:
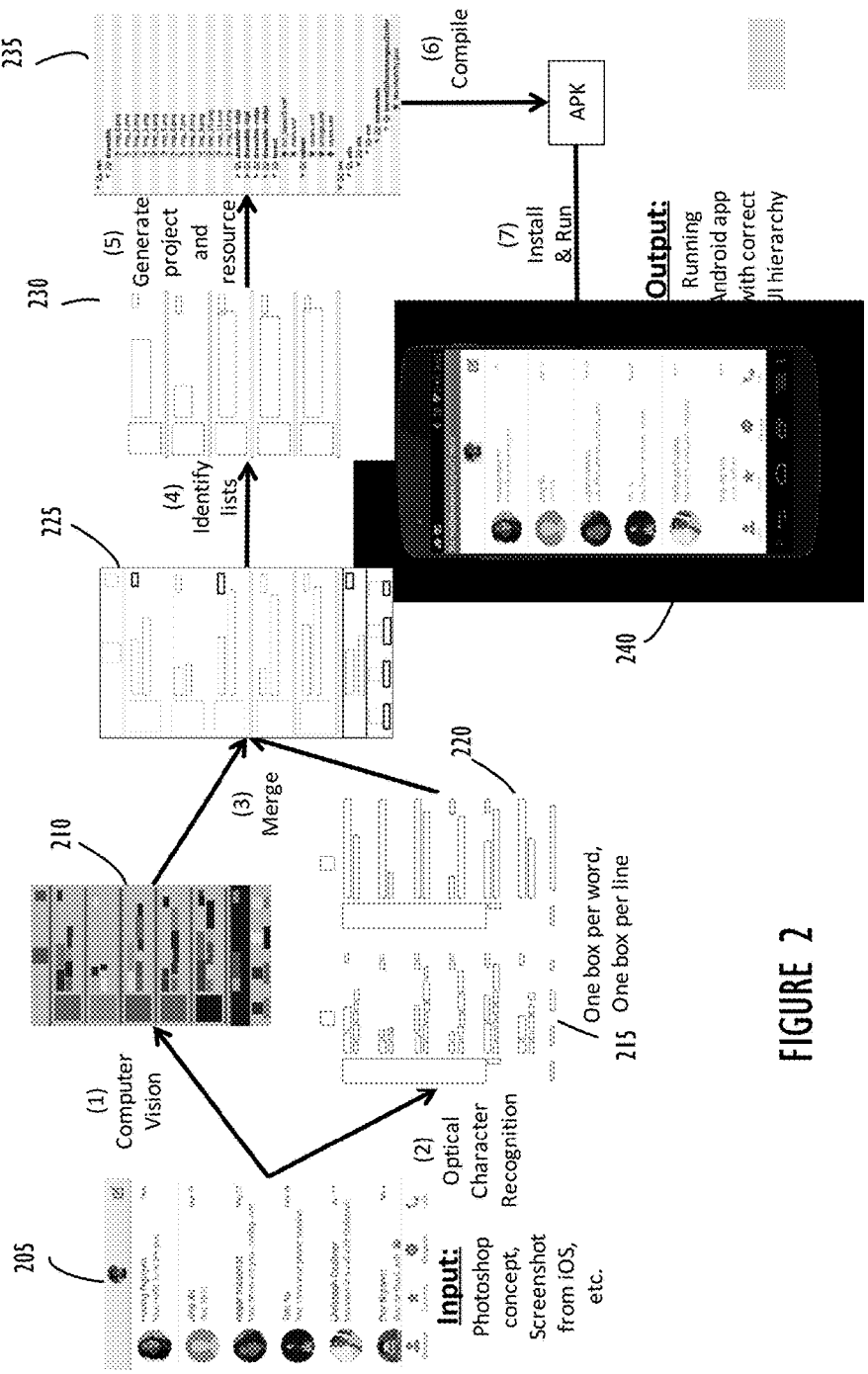
FIG. 2 illustrates a high level overview of a GUI generation process as a series of stages represented by images, according to some disclosed embodiments.

FIG. 2 shows six main processing operations or steps performed on an input graphical representation of a GUI (element 205). One of these operations is OCR (identified in FIG. 2 as (2), with results or output shown as elements 215 and 220). OCR may be performed by an OCR engine. Since, as mentioned, OCR produces false positive candidate words, the OCR results are filtered using domain-specific heuristics (discussed below). Both to further compensate for OCR's limitations and to identify non-text elements such as images, the OCR output is combined with the output of computer vision processing performed by a computer vision system. Thus, computer vision processing, identified in FIG. 2 as (1) with its output as element 210, is a second one of the main processing operations. The computer vision processing is used, e.g., to identify and locate the approximate boundaries of each screen element (e.g., atomic UI element) such as text and images (discussed below).

The third main processing operation is the merging of the OCR and computer vision results or outputs. This merge operation is identified in FIG. 2 as (3), with its output as element 225. The fourth main processing operation is the identification of structures, such as lists, in the merged data (output). This operation is indicated in FIG. 2 as (4), with its output as element 230. The fifth main processing operation is the exporting of the inferred UI as a combination of layout declarations and program source code for the selected target mobile platform. This operation is indicated in FIG. 2 as (5), with its output as element 235. The sixth main processing operation is the compiling of this combination to binaries, and the running of the binaries on a mobile device (e.g., an unmodified smartphone). This operation may be understood as two suboperations, which are indicated in FIG. 2 as (6) (compiling) and (7) (installing and running), with their ultimate output as element 240.

Not shown in FIG. 2 is a pre-processing step in which the standard OS title and navigation bars, if present, are removed. Since these screen areas are standardized it is relatively easy to detect and remove them.

As will be understood from the description herein, in accordance with some disclosed embodiments, analysis of the input graphical representation includes a multi-pass processing method that uses results of one or more previous processing passes to continually refine the previously learned information. It is not necessary that every processing pass be performed in the order shown for process 100. However, clearly, a processing pass providing an output to be used as an input to a subsequent processing pass must be performed in an order such that its output is available when needed. Also, certain processing passes may be performed in parallel where possible. In FIG. 2, for example, the OCR process (2) and the computer vision process (1) may be performed as separate, independent processes, and either one may be performed before the other, or the two may be performed in parallel.

The following discussion will refer concurrently to both FIGS. 1 and 2. In that regard, reference numerals beginning with the digit "1" refer to elements appearing in FIG. 1, and reference numerals beginning with the digit "2" refer to elements appearing in FIG. 2.

Process 100 begins at block 110 where a target OS is identified. The target OS represents the desired output format of the generated source code. For example, a user may wish to produce an application that will execute on ANDROID®, IOS®, WINDOWS® Phone Operating System, or other mobile OS. Each of these OSs will likely have a different development environment structure to populate with the generated source code. At block 120, an input graphical representation of the proposed GUI (element 205) is obtained. At block 130, computer vision techniques are applied to the input graphical representation (element 205) to identify attributes (e.g., candidate atomic elements) of the UI screen. The output of block 130 is a view hierarchy representation of vision boxes, i.e., nested bounding boxes of screen elements identified using computer vision (element 210). The hierarchy may be thought of as a tree structure, as described above, with various types of nodes (e.g., root, parent, child, leaf). At block 140, an OCR process is performed to identify areas of text in input image 205. This may include, e.g., determining orientation and proximity of text candidates. There are two different outputs of OCR process 140. One output (element 215) shows where individual words are identified and placed within their own bounding boxes ("one box per word"). The other output (element 220) shows where lines of text are identified without regard to individual word boundaries, and bounding boxes are identified for each line ("one box per line"). At block 150, output OCR words 215 and output view hierarchy 210 are merged to identify where an OCR word is aligned within a computer vision box and vision boxes that do not align with any particular set of words, in order to potentially identify graphical elements containing sets of complete words. The output of this merge operation (block 150) is used to identify valid words (words and vision boxes aligned), invalid words (words and vision boxes not aligned), and vision boxes containing no words. If a vision box exactly aligns with a set of words the vision box may represent a button, list element, or the like. Alternatively, if a vision box and underlying words are not aligned then the vision box likely represents an icon or pure graphical (i.e., non-text) element. At block 160, a merge operation (discussed with reference to FIG. 6 below) is performed using as input valid words (specifically, a refined version of output OCR words 215) and OCR output text lines 220 to identify valid text boxes where multiple valid word boxes are aligned with a 'one box per line' OCR text line of output 220. (The reference in block 160 of FIG. 1 to "split lines" will be understood in the discussion of FIG. 6.) At block 170, the valid text boxes identified in step 160 are merged with the computer vision box hierarchy (element 210) using an algorithm described below with reference to FIG. 7 to identify a screen view and its blocks. This refinement identifies actual text boxes and unknown vision boxes that might later be determined to be graphical (non-text) elements, such as icons. At block 180 (discussed with reference to FIG. 8 below) additional processes are performed on the result of the previous plurality of merge passes, to create a further refined view hierarchy (element 225) for the specific target OS. This view hierarchy is a hierarchy of views as discussed above in the background section prior to the discussion of FIG. 1 and is different from element 210, which includes only computer vision boxes identified by computer vision processing; element 225 includes OCR information as well as additional refinement performed by the several merge operations. The act of creating a view hierarchy will likely have a different implementation for each different target OS selected as an initial input but for simplicity is illustrated as a single operation of process 100. Block 182 represents a process (discussed below with reference to FIG. 9) to identify repeated items that may represent list view elements. A list view element is an element that displays a list of scrollable items. After all identifiable GUI elements have been determined by the operations performed thus far, flow continues to block 184 (discussed below with reference to FIG. 10) where a development project (element 235) appropriate for the target OS is created and populated with source code that may be compiled (block 186) to generate an application (element 240) having a UI conforming to the originally proposed graphical representation. Given this as a starting point, a developer can then add in business logic code to the development project (block 188) to generate a fully functional mobile application and refine the generated code as necessary to correct any errors introduced in the software code generation process.

With the understanding provided by the overview presented above, further detail pertaining to specific portions of the disclosed GUI source code generation process will be described with reference to FIGS. 3-10. FIGS. 3-10 maintain element numbers introduced in FIG. 2 where appropriate.

Figure 3:
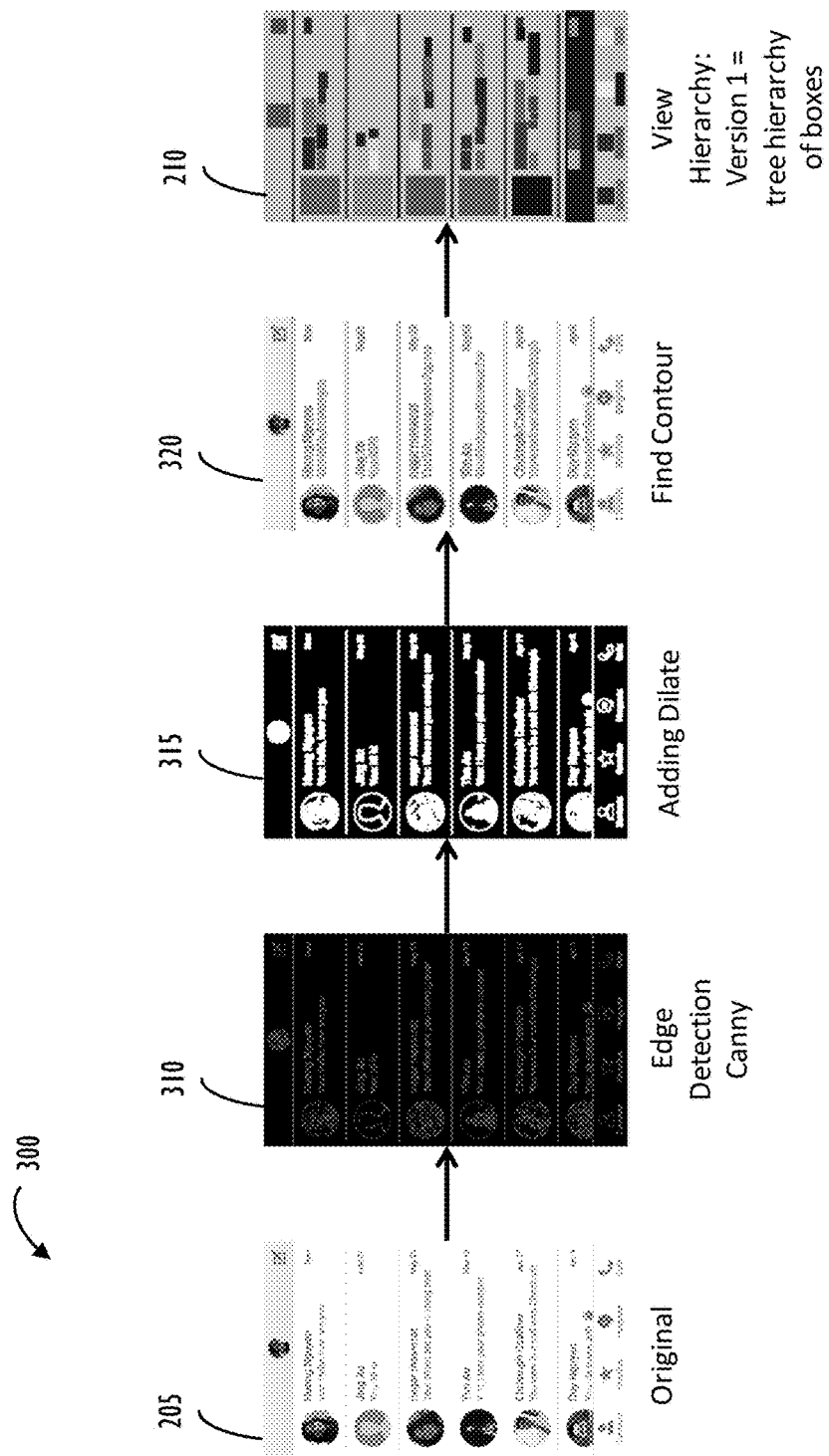
FIG. 3 illustrates operations of a computer vision processing method, according to some disclosed embodiments.

Turning to FIG. 3, diagram 300 illustrates a process for inferring or determining a first candidate view hierarchy 210 using computer vision techniques as applied to an input graphical representation 205 according to some disclosed embodiments. Before describing the contents of FIG. 3, certain contextual remarks are in order.

Two important observations are that (1) many vastly different view hierarchies can lead to very similar if not identical onscreen appearances and (2) a programmer will likely find some of these view hierarchies more valuable than others. According to embodiments disclosed herein, heuristics may be carefully chosen and followed to produce desirable view hierarchies that balance the following two goals.

The first goal is a minimal hierarchy, i.e., a hierarchy having a minimum number of nodes. From the programmer's perspective this is preferable to prevent clutter in the generated code. More importantly, drawing a large number of views slows down the application. For example, a programmer would not want a container that contains one child view for each character of every word displayed by the container.

However, a competing goal is maximum flexibility of the inferred view hierarchy. Preferably, distinct UI elements should be represented by distinct views to allow the generated UI to be well displayed on various screens characterized by different combinations of screen size and resolution. Thus, for example, to maintain flexibility a programmer may not want to represent the four distinct buttons of the bottom-screen navigation bar in FIG. 2 (element 205) as a single image, even though combining these four buttons into a single image and a single leaf view would reduce the number of views.

To infer a good candidate view hierarchy, it is attempted to identify all atomic visual elements in the input graphical representation of the UI. By "atomic visual element" (also referred to as "atomic element," "atomic UI element," or the like) we mean a visual element that reasonably should not be divided further. For example, an icon is atomic but an entire text paragraph can also be atomic. For each atomic visual element that is identified, its approximate view is computed or determined.

To achieve these tasks, a computer vision system is leveraged. FIG. 3 illustrates exemplary computer vision operations performed on the input bitmap (graphical representation of UI) (element 205 in FIG. 2). We now turn back to FIG. 3.

First, input image (graphical representation) 205 is processed using a Canny edge detection algorithm to identify or detect edges of items and objects (image elements) included in input image 205 to produce a modified Canny image 310. But these edges themselves are not good candidates for atomic elements as, for example, each character or even minor noise would become its own element. Accordingly, an image dilation procedure is run on Canny image 310 to produce a dilation image 315. That is, to merge close-by elements with each other and with surrounding noise and to close almost-closed contours, the detected edges are dilated. A heuristic may be used, for example, to allow a word's characters to merge but keep words separate.

Image dilation is a method of morphological image processing. Morphological image processing is a collection of non-linear operations related to the shape or morphology of features in an image. In general, a goal of morphological image processing is to remove imperfections in a digital image by accounting for the form and structure of the image. Morphological image processing techniques may utilize a structuring element that is a small binary image defined by a small matrix of pixels each with a value of zero or one. Structuring elements may be used in morphological image processing in the same way as convolution kernels are used in linear image filtering. When a structuring element is placed in a binary image such as Canny image 310, each of its pixels is associated with the corresponding pixel of the neighborhood under the structuring element. The structuring element is said to "fit" the image if, for each of its pixels set to 1, the corresponding image pixel is also set to 1. Similarly, a structuring element is said to "hit," or intersect, an image if, for at least one of its pixels set to 1 the corresponding image pixel is also 1. The dilation of an image by a structuring element produces a new binary image (e.g., dilation image 315) with 1's in all locations of a structuring element's reference pixel (i.e., origin) at which that structuring element hits the input image and 0 otherwise. Dilation has the effect opposite to that of erosion (another morphological image processing technique) in that it adds a layer of pixels to both the inner and outer boundaries of regions. Morphological image processing includes techniques that are known to those of ordinary skill in the art and therefore will not be discussed in more detail here.

Following the dilation procedure, the dilated edges' contours are computed, to produce a contour image 320. Each contour is a candidate atomic element.

Contour tracing is one of many preprocessing techniques performed on digital images in order to extract information about their general shape, i.e., the shape of features included within the digital image (e.g., input graphical representation 205). In an image comprising pixels each having a value of 1 or 0, those having a value of 1 may be said to make up the 'pattern' and those having a value of 0 may be said to make up the 'background'. Once the contour of a given pattern is extracted, its different characteristics may be examined and may serve as features that will later be used for pattern classification. Therefore, correct extraction of the contour will produce more accurate features, which will increase the chances of correctly classifying a given pattern. Because the contour shares a lot of features with the original pattern but contains only a small subset of the total number of pixels representing the pattern, the feature extraction process becomes more efficient when performed on the contour rather on the original pattern. Thus, contour tracing may contribute significantly to the efficiency of the feature extraction process.

FIG. 3 also illustrates the heuristic nature of the process. The last list entry shown in the input screen is cut off by a horizontal dividing line. Edge detection, dilation, and contour processes may merge the last list item with the dividing line.

Finally, following the contour process, the bounding box of each candidate atomic element is computed, to approximate the element's view. Recall that typically each view is rectangular and fully contained within its parent. Partially overlapping boxes are thus merged into a new bounding box. A fully contained box becomes the child view of the containing box. The end result or output of the computer vision processing of FIG. 3 is a view hierarchy of the contours' bounding boxes (element 210).

It will be noted regarding the operations in FIG. 3 that each one produces an output that serves as the input for the subsequent one. That is, the output 310 of the Canny Edge Detection process is the input of the dilation process, and the output 315 of the dilation process is the input of the contour process. Of course, the initial input in FIG. 3 (for the Canny Edge Detection process) is original image 205, and the ultimate output is view hierarchy 210.

It will be appreciated by one of ordinary skill in the art that computer vision processes and techniques other than those described above with reference to FIG. 3, or other combinations of those described with reference to FIG. 3 (including all or some of those operations) may be used to carry out a computer vision process such as that described with reference to FIG. 3 and obtain a result appropriate for use with the remainder of the operations described in this disclosure.

Figure 4:
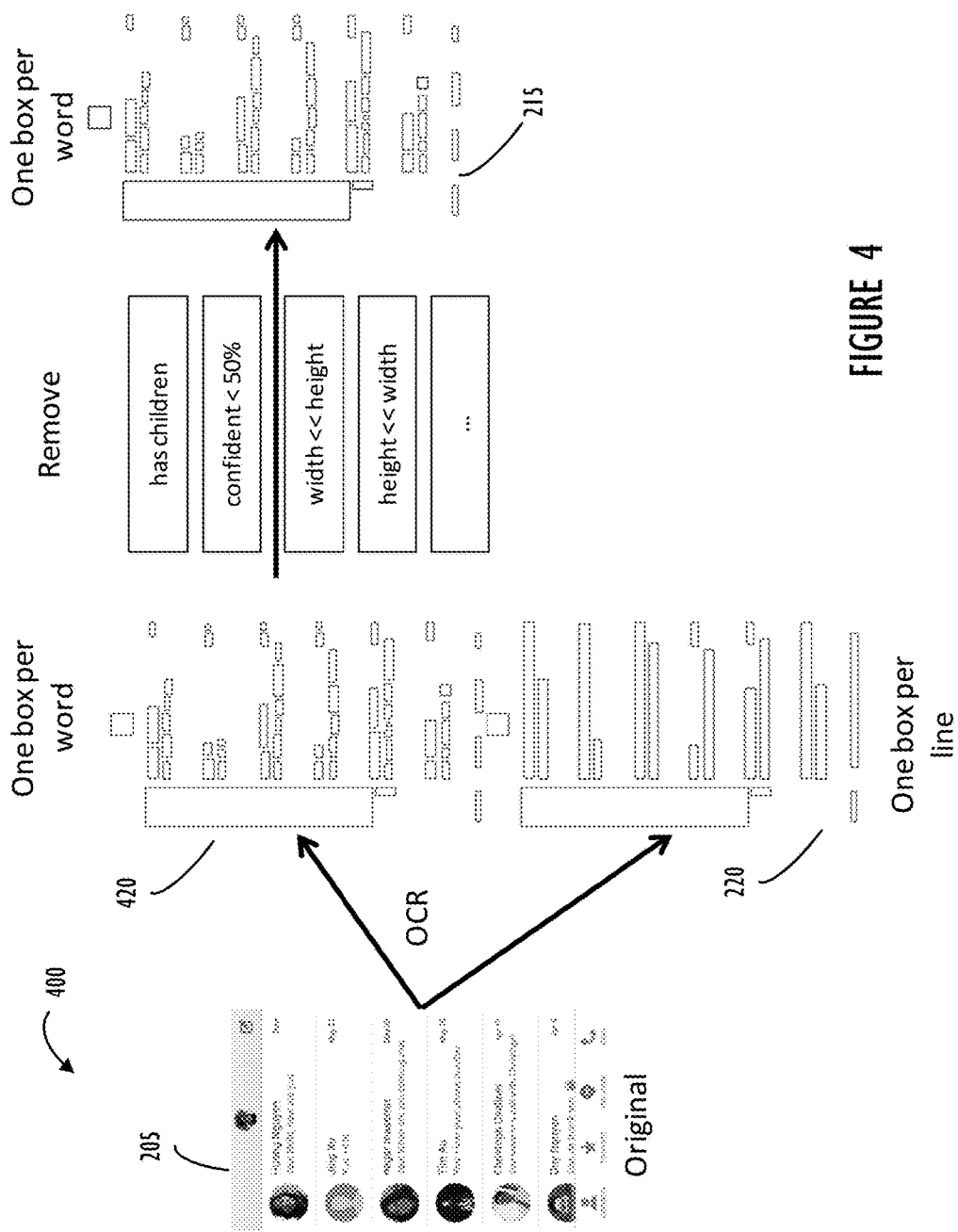
FIG. 4 illustrates an initial phase of optical character recognition to identify text (words and text lines) in an input graphical representation, according to some disclosed embodiments.

Turning to FIG. 4, diagram 400 illustrates an OCR process applied to the input bitmap (image 205) to identify candidate text (words and lines of text), followed by post-processing to improve the initial result (with respect to the candidate words). The application of the OCR process to input image 205 initially yields image 420 and image 220. In image 420 candidate words have been identified—groups of characters have been placed inside respective bounding boxes. In image 220 candidate lines of text have been identified—lines of text have been placed inside respective bounding boxes. Image 420 represents an initial stage, prior to image 215. Image 420 includes candidate words that are not really words but are actually non-text elements such as images or parts of images, which have been erroneously identified as words by the OCR processing. Thus, image 420 undergoes a subsequent processing step ("Remove" in FIG. 4) to increase accuracy by further refining the analysis of each candidate word to eliminate candidates that are unlikely to be true words (false positives obtained in the OCR processing), thus also identifying bounding boxes that are likely to contain true words.

To remove likely false positive words, knowledge about the mobile phone UI domain is encoded as heuristics, which are summarized in Table I. As an example, rule 3 encodes that on a phone screen a word is likely not cut off and thus does not extend beyond the border of the screen. This rule is specific to phone screens and does not necessarily apply to other cases.

TABLE I

Heuristics for eliminating likely false positive candidate words from the OCR results

| # | Name | Heuristic |
|---|------|-----------|
| 1 | Zero | $h = 0 \lor w = 0$ |
| 2 | Long | $w/h < 0.05 \lor h/w < 0.05$ |
| 3 | Cut off | $x < 0 \lor y < 0 \lor x + w > W \lor y + h > H$ |
| 4 | Conf. | $c \leq 0.4$ |

TABLE I-continued

Heuristics for eliminating likely false positive candidate words from the OCR results

| # | Name | Heuristic |
|---|------|-----------|
| 5 | Content | $c \leq 0.7 \land (\ \{|e_h/e_w - h/w|\}\ /\{\max(e_h/e_w, h/w)\} > 0.5 \lor \{|a - e|\}/\{\max(a, e)\} > 0.8)$ |
| 6 | No-text | $[\backslash p\{C\}\backslash s]\ *\ \lor\ [\ \backslash\backslash x00-\backslash\backslash x7F]\ *$ |

The heuristics are given in terms of the input data, the OCR results, and computed heuristic values. Specifically, from the input UI screen (input image 205) can be obtained its width (W) and height (H). The OCR system produces for each of its candidate words the word's height (h), width (w), area (a=w*h), font family and size, upper left corner coordinates (x, y), text content (t), and confidence level (c). The confidence level is derived from the distance of the word's characters from idealized characters.

From the text content and font information produced by OCR for a given word, the width ($e_w$), height ($e_h$), and area (e) the candidate word should occupy, given the font size and family, are estimated. Rule 5 uses this information to remove a word if, within bounds, the estimated text area does not match the text area reported by OCR. This rule removed all four candidate words that are shown as removed in image 215 in FIG. 4.

The other rules exclude words that OCR is not confident about (rule 4), that have a zero dimension (rule 1), or that have an odd shape (rule 2; width much less than height or height much less than width). An odd shape likely does not capture an English-language word, as English-language words are long and narrow, vertically or horizontally. Finally, rule 6 removes words that contain only non-ASCII characters or consist of only control characters and whitespace.

The heuristics' constants may be derived through trial and error on a small set of bitmaps.

As seen in FIG. 4, the heuristics shown under the word "Remove" include some of those included in Table I, an additional heuristic (specifically, if the candidate has children it is not likely a true word) and possible additional heuristics as represented by the ellipsis.

To be sure, subsets of the heuristics described herein, or sets of heuristics other than the set described herein (either including some or all of them or not), may be used in place of the set described herein and still provide a useful result.

Thus, by applying the heuristics to initial result 420, false positive candidate words may be eliminated. This is represented in FIG. 4, in that in initial result 420 all candidate words are shown in ordinary bounding boxes, whereas after the application of the heuristics those candidates that were determined to be false positives are shown in final result 215 as bounding boxes containing X's (namely, in element 215: the long vertical box at the left side and the square, topmost box).

Thus, while the input in FIG. 4 is input graphical representation 205, at the end of the OCR process and post-process illustrated in FIG. 4, the outputs are image 215 (indicating words, one per box) and image 220 (indicating lines of text, one per box).

Thus, at this point in processing, we have created a view hierarchy of boxes image 210 using computer vision techniques (FIG. 3), a one box per word image 215 using OCR techniques (FIG. 4), and a one box per line image 220 using OCR techniques (FIG. 4).

The next operations in the overall process (source code generation of mobile application including GUI) are merge operations that merge the results of OCR and computer vision obtained thus far to heuristically combine the best aspects of both and to integrate the OCR-inferred text into the computer vision-inferred candidate view hierarchy.

Figure 5:
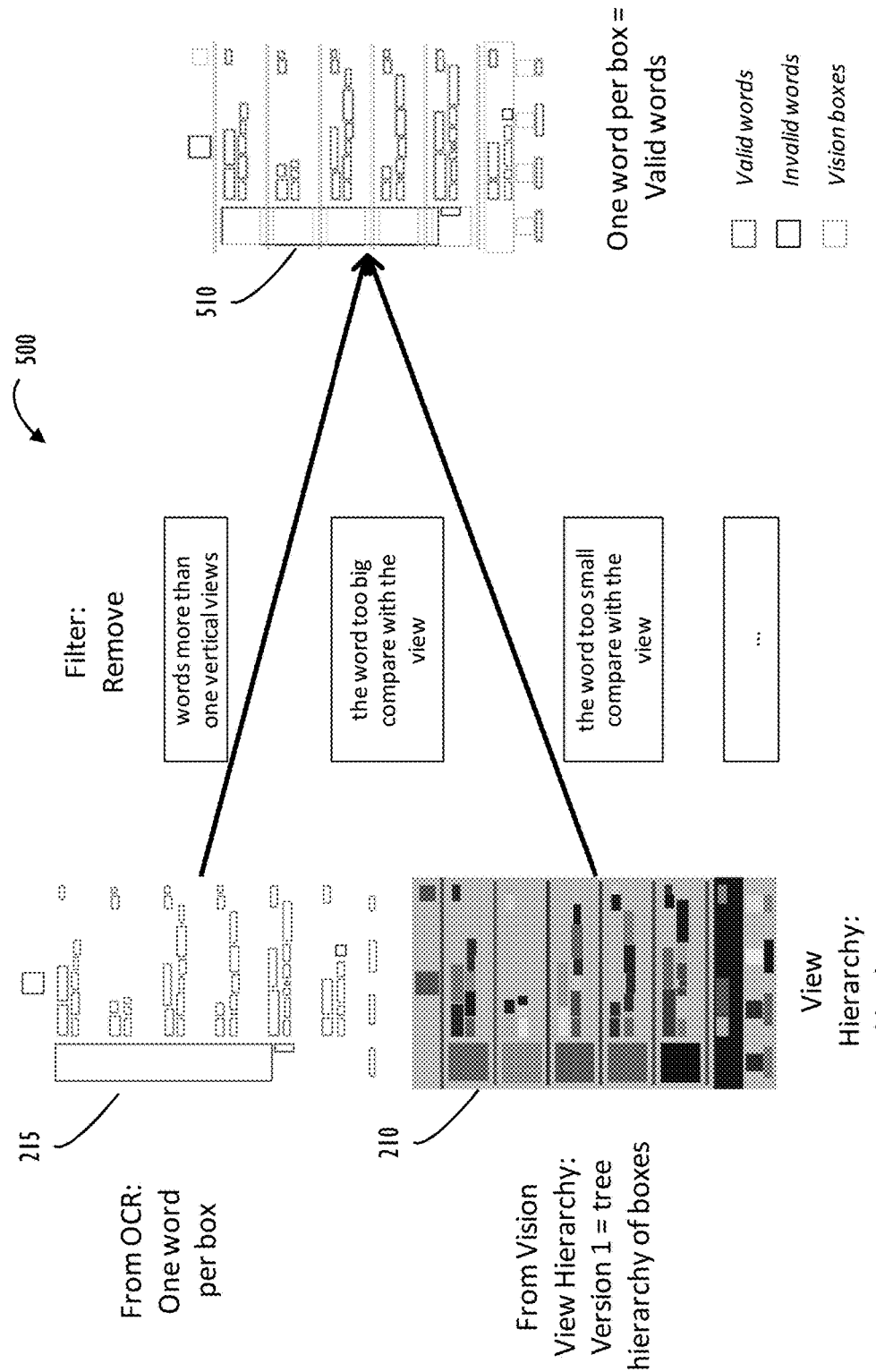
FIG. 5 illustrates a first merge process merging an OCR (words) output of FIG. 4 and computer vision output of FIG. 3 to produce a 'valid words' output, according to some disclosed embodiments.

Thus, FIG. 5 illustrates a process in which OCR-identified words (image 215) are matched to (or merged with) computer vision boxes (image 210), that is, OCR-detected words that conflict with computer vision-inferred element bounding boxes are removed. This operation addresses common OCR false positives such as classifying part of an image as a text fragment, classifying bullet points as an "o" or similar character, and merging lines of text that have too little spacing. In the case of such false positives, the resulting OCR-extracted text should instead be classified and exported as an image.

Turning to FIG. 5 itself, diagram 500 illustrates that image 215 (OCR words; output of FIG. 4 process) and image 210 (view hierarchy of computer vision boxes; output of FIG. 3 process) are provided as inputs to a merge filter ("Filter: Remove" in FIG. 5) to identify valid words, invalid words and vision boxes. Valid words correspond to areas where an OCR box representing a word properly 'fits' within a corresponding vision box. Invalid words correspond to areas where an OCR box does not fit within a corresponding vision box. Here, in FIG. 5, vision boxes correspond to areas that do not have text and are likely to be determined later on to be an icon or graphical (non-text) portion of the GUI. The identification of valid words, invalid words and vision boxes may be accomplished by heuristics such as: a) filtering the inputs to remove words that span more than one vertical view; b) filtering words that are too big to fit within a corresponding view box; c) filtering words that are too small relative to their corresponding view box (don't adequately fill the view box); and/or (d) filtering based on other heuristics (represented by the box showing the ellipsis under "Filter: Remove" in FIG. 5). In general, if a candidate individual word is not contained, within a threshold, in a corresponding vision box, or does not fill, within a threshold, a corresponding vision box, then it is not likely a valid word and should be eliminated. The operation of the merge filter ("Filter: Remove") on input images 215 and 210 yields output image 510, in which valid words, invalid words, and vision boxes are identified, as indicated by the legend under image 510 in FIG. 5 (ordinary box represents valid words, box containing X represents invalid words and box drawn in dashed lines represents vision boxes).

With regard to the heuristics of the filters ("Filter: Remove") for merging image 215 (OCR words) and image 210 (view hierarchy of computer vision boxes), another, e.g., more sophisticated or comprehensive, set of heuristics is presented in Table II below.

TABLE II

Heuristics for additional eliminations of OCR words, based on computer vision results

| # | Description |
|---|---|
| 1 | Word aligns vertically & overlapped ≥70% with ≥2 vision boxes that do not overlap each other |
| 2 | Word aligns horizontally & overlapped ≥70% with ≥2 vision boxes, distance between each pair of boxes > each box's size |
| 3 | Word contains a non-leaf vision box |
| 4 | Word contains only 1 vision box, box size <0.2 word size |

TABLE II-continued

Heuristics for additional eliminations of OCR words, based on computer vision results

| # | Description |
|---|---|
| 5 | Non-overlapped leaf vision box contains only 1 word, word size <0.2 box size |
| 6 | If leaf vision box's words are >50% invalidated, invalidate the rest |
| 7 | If >3 words are the same text and size, aligned left, right, top, or bottom, each has <0.9 confidence, and are non-dictionary words |
| 8 | Leaf vision box contains a word, M < 0.4 $\vee$ (M < 0.7 $\wedge$ m < 0.4) $\vee$ (M >= 0.7 $\wedge$ m < 0.2), with m = min(w/$b_w$, h/$b_h$), M = max(w/$b_w$, h/$b_h$) |

As seen in Table II, in addition to the OCR word's width (w) and height (h), we now also have the computer vision bounding box's width ($b_w$) and height ($b_h$). For example, rule 1 checks if an OCR word overlaps with two vision boxes whose y-coordinates do not overlap. This happens if OCR merged two text lines whereas the vision results kept them separate. Further, OCR-identified words (in image 215) that are not contained by an OCR-identified text line (in image 220) are removed.

Figure 6:
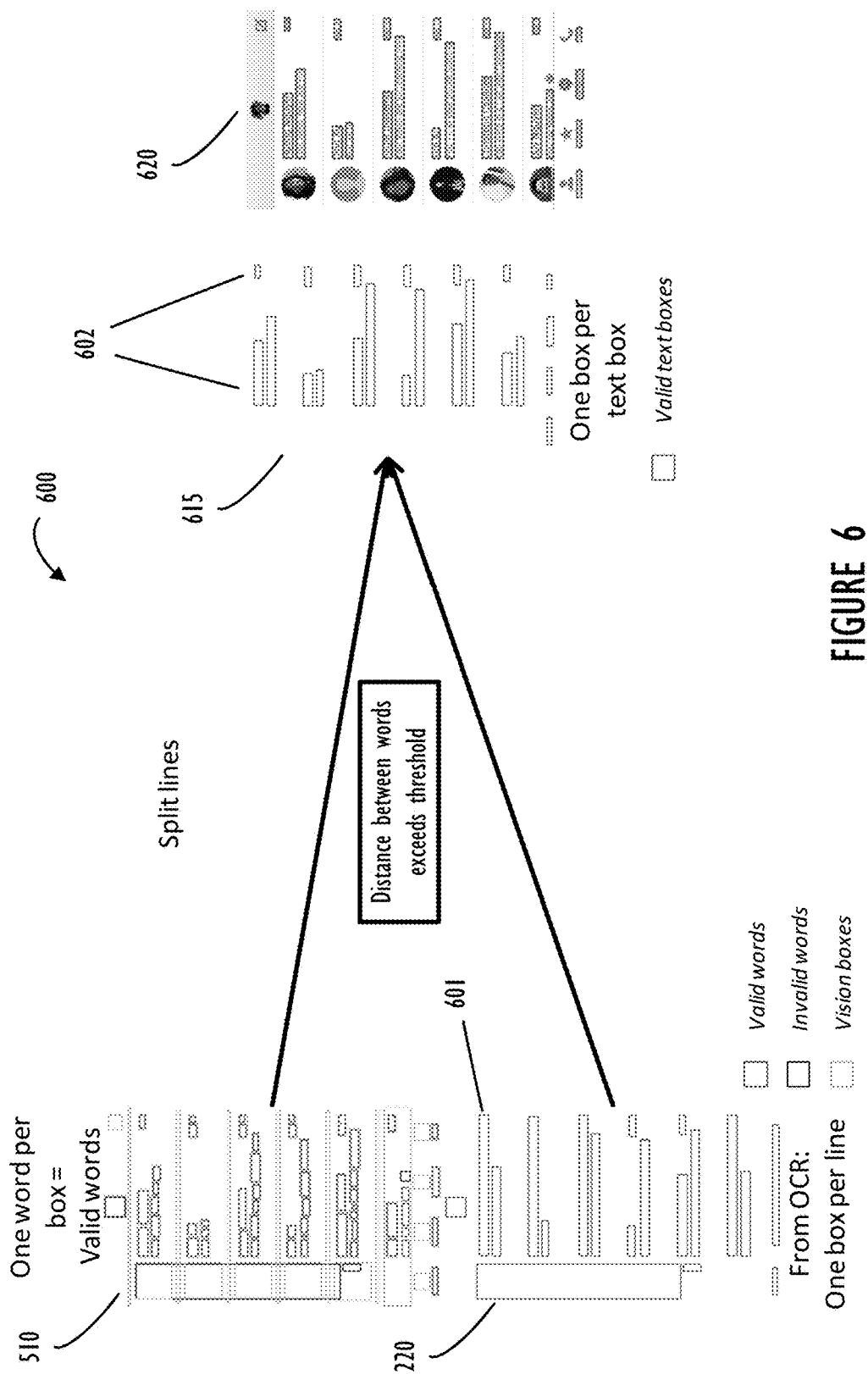
FIG. 6 illustrates a second merge process merging the output of FIG. 5 and an OCR (text lines) output of FIG. 4 to identify valid text boxes, according to some disclosed embodiments.
Figure 7:
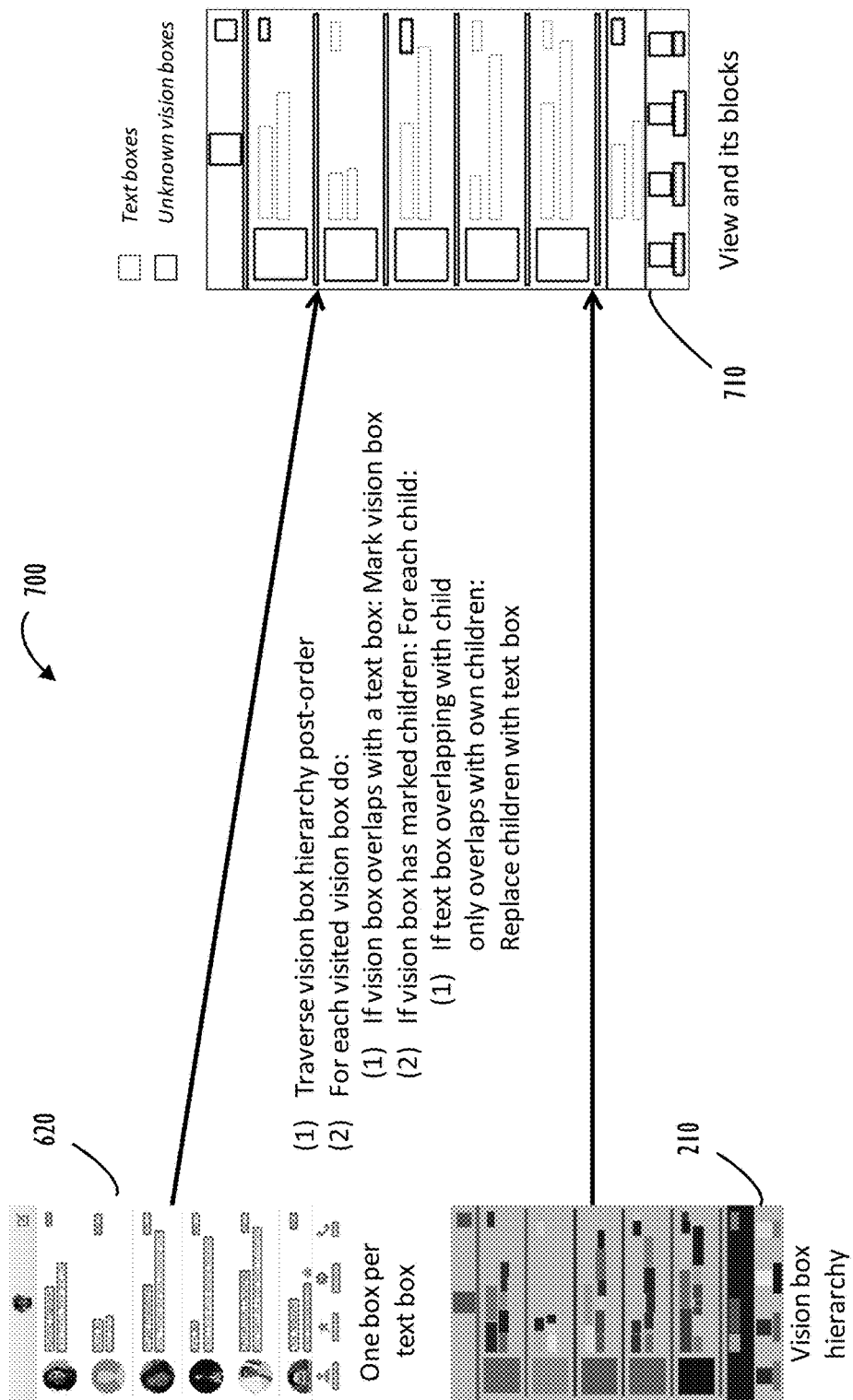
FIG. 7 illustrates a third merge process merging valid text boxes and vision box hierarchy information to produce a view and its blocks, according to some disclosed embodiments.
Figure 8:
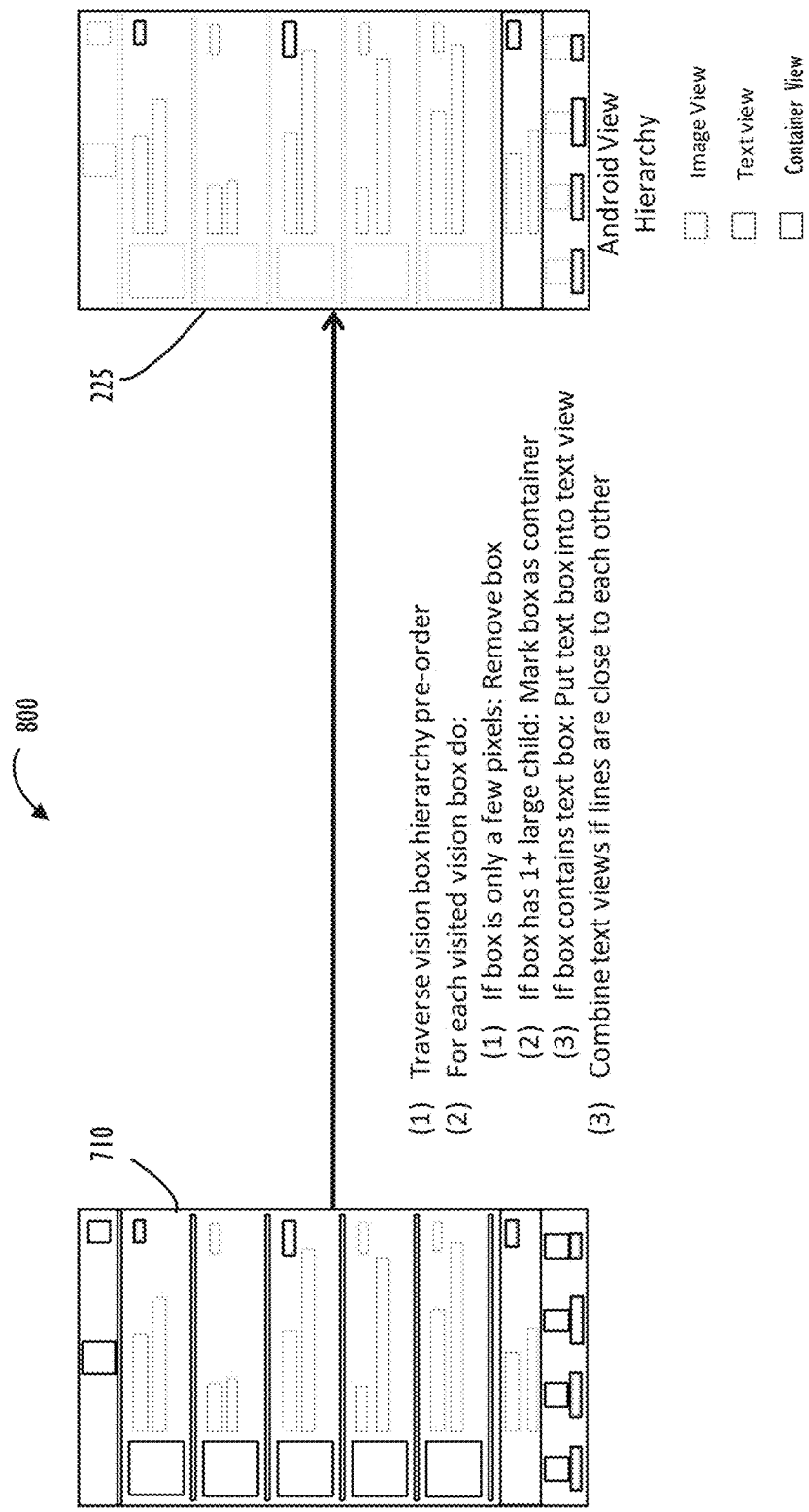
FIG. 8 illustrates a process for generating, from the output of FIG. 7, a further refined view hierarchy for the target operating system (OS), according to some disclosed embodiments.

FIG. 6 illustrates another merge operation. In this operation, OCR words (in image 510) and OCR text lines (in image 220) are merged into text blocks (put another way, OCR text lines are split into text boxes). OCR text lines often blend together into a single line unrelated text that just happens to be printed on the same line. For example, in element 205 (the original input graphical representation) in FIG. 2, contact names (at left) appear on the same respective lines as corresponding message dates (at right), even though the contact names and the message dates are conceptually separate entities. Accordingly, a text line is split if the word-level OCR indicates that the distance between two words exceeds a heuristic threshold (e.g., the height of the words). FIG. 6 (described in more detail below) illustrates this process. The resulting text blocks are added to the view hierarchy and the vision boxes they overlap with are removed from the view hierarchy. Further refinements are also carried out. FIGS. 6-8 (described in more detail below) illustrate these processes.

An OCR engine may produce better text contents when treating its input as a single text line. This way the OCR engine does not have to reason about which parts of the input are text and which parts are non-text. Thus, OCR may be invoked on each text block (in line mode), yielding text that resembles the text in the input relatively closely. Finally, nearby text blocks may be grouped into a container, if the vertical distance between the text blocks is less than a threshold, e.g., either of their heights. See the discussion of FIG. 8.

Let us turn now to FIGS. 6-8 themselves. Turning first to FIG. 6, as shown in diagram 600, the inputs at this stage are image 510 (OCR words) and image 220 (OCR text lines). Image 510 is the output of the merge operation of FIG. 5, and image 220 is an output of the OCR process of FIG. 4. Inputs 510 and 220 are merged together. In the merge operation, as mentioned, a text line is split between two words if the distance between the words is greater than a threshold, such as the words' height. Examples of text lines that have been split are seen by comparing the text lines in image 220 (before splitting) with the corresponding text lines in image 615 (after splitting). Thus, text line 601 in image 220 is a line before being split, while text line 602 in image 615 is the corresponding line after having been split. As seen, many of the text lines in image 220 are split as seen in image 615. The splitting is performed in this manner to identify groupings of words (e.g., phrases) that belong together on a GUI screen. Such groupings may be referred to as text blocks, and the boxes containing such groupings may be referred to as text boxes. The result of this step (line splitting) is image 615, in which valid text boxes have been identified. Then, image 615 and original input image 205 are merged or overlaid, yielding image 620, in which text blocks and images are identified. In this way it can be determined where there is text and where there are images on the GUI screen being generated.

Turning to FIG. 7, diagram 700 illustrates another merge operation, in which text boxes (obtained in the process of FIG. 6) are added to the view hierarchy of computer vision boxes. The inputs at this stage are image 620 (output of the operation of FIG. 6) and image 210 (view hierarchy of computer vision boxes; output of FIG. 3 process). These inputs are merged to produce image 710 as an output. Image 710 is said to define a view and its blocks, and this image shows identified text boxes and unknown vision boxes.

In the operation of FIG. 7, the vision box hierarchy (of image 210) is traversed post-order from leaf node to parent node. The process for creating image 710 includes the following processing steps (or heuristics). For each node visited during traversal it is determined if the bounding box associated with the node overlaps with a text box (of image 620). If the node's bounding box overlaps with a text box, the node is marked as a vision box. If the bounding box of the current node has marked children then, for each child of the current node, if a text box overlaps with a child and overlaps only with its own children then the children of the current node are replaced with a text box. At the end of the traversal the resulting image 710 is created, in which text boxes and still yet unknown vision boxes are identified. Image 710 is referred to as an image identifying a view and its blocks.

Referring now to FIG. 8, diagram 800 illustrates an operation for producing an ANDROID® view hierarchy. At this stage, the input is image 710 (the output of the FIG. 7 process). In this operation, a second traversal of the vision box hierarchy is performed. The result or output of the operation is an ANDROID® view hierarchy, shown as image 225. As mentioned above, this disclosure is applicable to various target OSs, and ANDROID® is used here as merely one example. This second traversal of the vision box hierarchy is performed in pre-order from parent nodes to children nodes, and it includes the following processing steps (or heuristics). In step (2)-(1), for each vision box (i.e., each node of the vision box hierarchy) visited, it is determined if the vision box has only a few pixels. For example, a very small vision box may represent noise generated in the processing of (or originally present in) input graphical representation 205. Thus, if the vision box is very small, the box may be considered noise and removed (filtered) from further processing. In step (2)-(2), if the vision box has one or more large children, then the vision box is marked as a container view for the one or more children. In step (2)-(3), if the box contains a text box, then the text box may be placed into a text view of the ANDROID® view hierarchy. Vision boxes that do not satisfy the criteria of any of steps (2)-(1), (2)-(2) and (2)-(3) may be deemed to be image boxes. After the traversal has been performed, in step (3) text views may be combined if the lines of text in the text views are close to each other, relative to a predefined threshold. The process of diagram 800 thus results in image 225, which is an ANDROID® view hierarchy of items identified as image views (shown by boxes drawn in dashed lines), text views (shown by ordinary boxes), and container views (shown by boxes containing an X). To recap in summary form, in image 710 a vision box that contains only image (non-text) content and that has no children is identified as likely an image view. If the vision box contains only text box(es), then it is identified as a text view. If the vision box has one or more children, then it cannot be an image view and is identified as likely a container view, and its children may be image views or text views.

Figure 9:
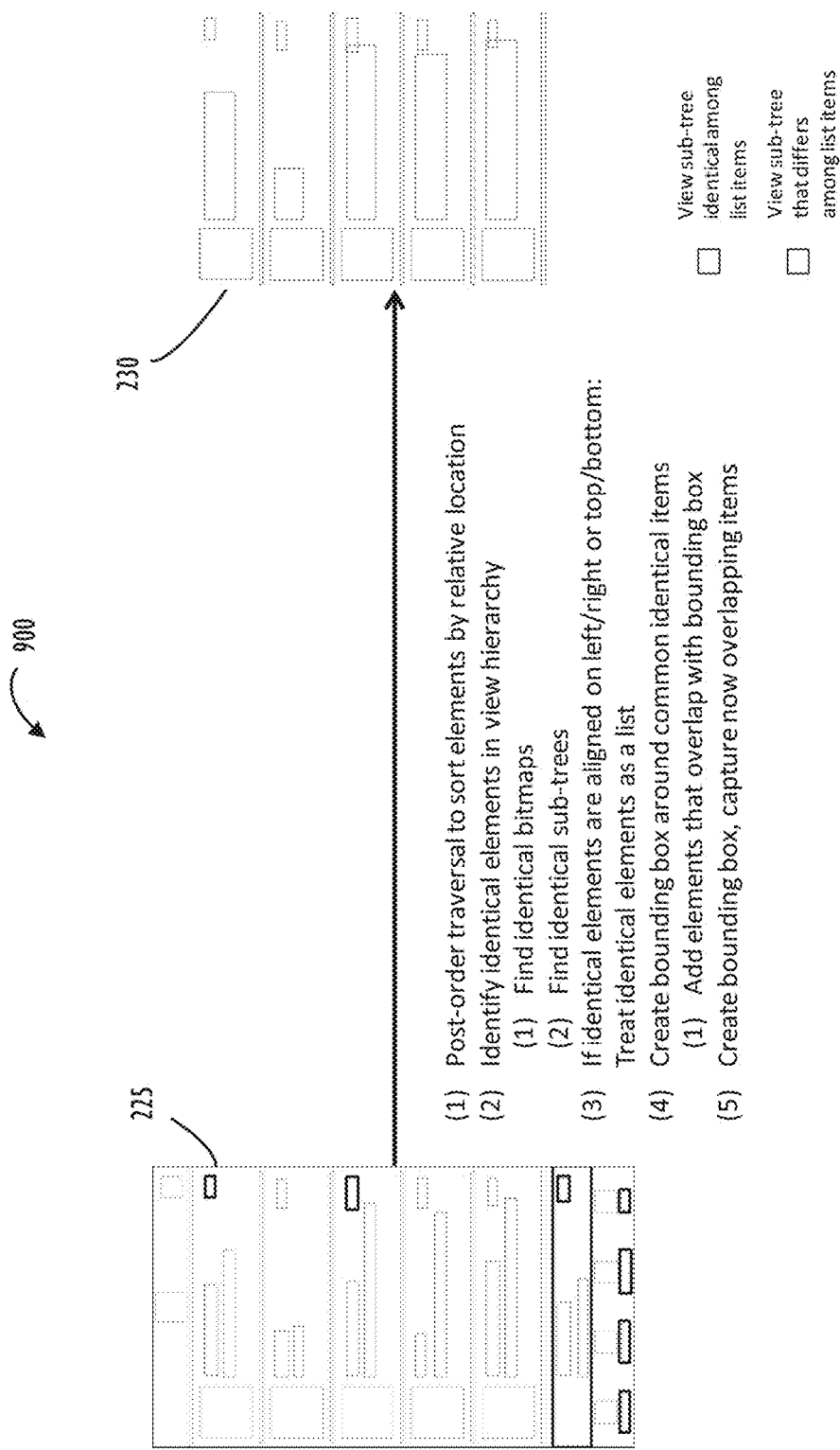
FIG. 9 illustrates a process for creating list view items from the output of FIG. 8 by, at least in part, identifying repeated items, according to some disclosed embodiments.

Referring now to FIG. 9, diagram 900 illustrates an operation in which repeated items are identified, so as to create a list view. Repeated items are identified and summarized as collections, at least for the following two reasons. First, the final UI definition is more compact and efficient if each repeated resource is only represented once. Second, this operation permits generalizing from a few instances to a generic collection. The observed instances can then be supplied as an example instantiation of the collection. In the operation of FIG. 9, image 225 (the output of FIG. 8) is provided as the input, and the operation generates image 230 as an output, which shows list views containing list view items. If a GUI is to present a list of items and not all the items fit on the screen at one time, a list view UI element can be employed whereby the list or the entire screen is rendered scrollable. A list view item is just an item of such a list.

In the operation of FIG. 9, a post-order traversal is performed on the ANDROID® view hierarchy (image 225) to sort elements by their relative locations. The operation includes the following processing steps (or heuristics). At step (2) identical elements in the view hierarchy are identified. These identical elements include (2)-(1) bitmaps and (2)-(2) sub-trees. Identical bitmaps are identified on the basis of being exactly equal (identical pixel values) to each other.

As for sub-trees, a sub-tree is a view (node) and a subset of its transitive children. Two sub-trees are identical if each of their child nodes has a peer in the other sub-tree, such that both nodes have the same number of children and the same width, height, type (text or image), and matching location within its parent (each within a threshold). Neither text contents nor image bitmaps have to be identical, as a list item may contain a unique item, for example, the face of a user, as seen in original input image 205 (FIG. 2).

At step (3), if identical elements are aligned on the left/right or top/bottom, they are treated as a list. At step (4), a bounding box is created around each identical item found. This generates the view sub-trees that are identical among list items (shown in image 230 by boxes whose lines are shown as alternating line segments and dots). Next, at step (4)-(1), elements that overlap with a created bounding box are added, and at step (5) additional bounding boxes are created capturing the overlapping items. This generates the view sub-trees that differ among list items (shown in image 230 by boxes whose lines are shown as dotted lines). That is, with reference to bounding boxes formed around identical sub-trees, each box contained in such a bounding box that is not part of the sub-tree belongs to the list item anchored by the sub-tree. However, such an overlapping box varies across list elements and will be exported as an optional element of the list entry. The properties of these optional elements are determined by overlaying all of them and using the resulting bounding boxes.

Figure 10:
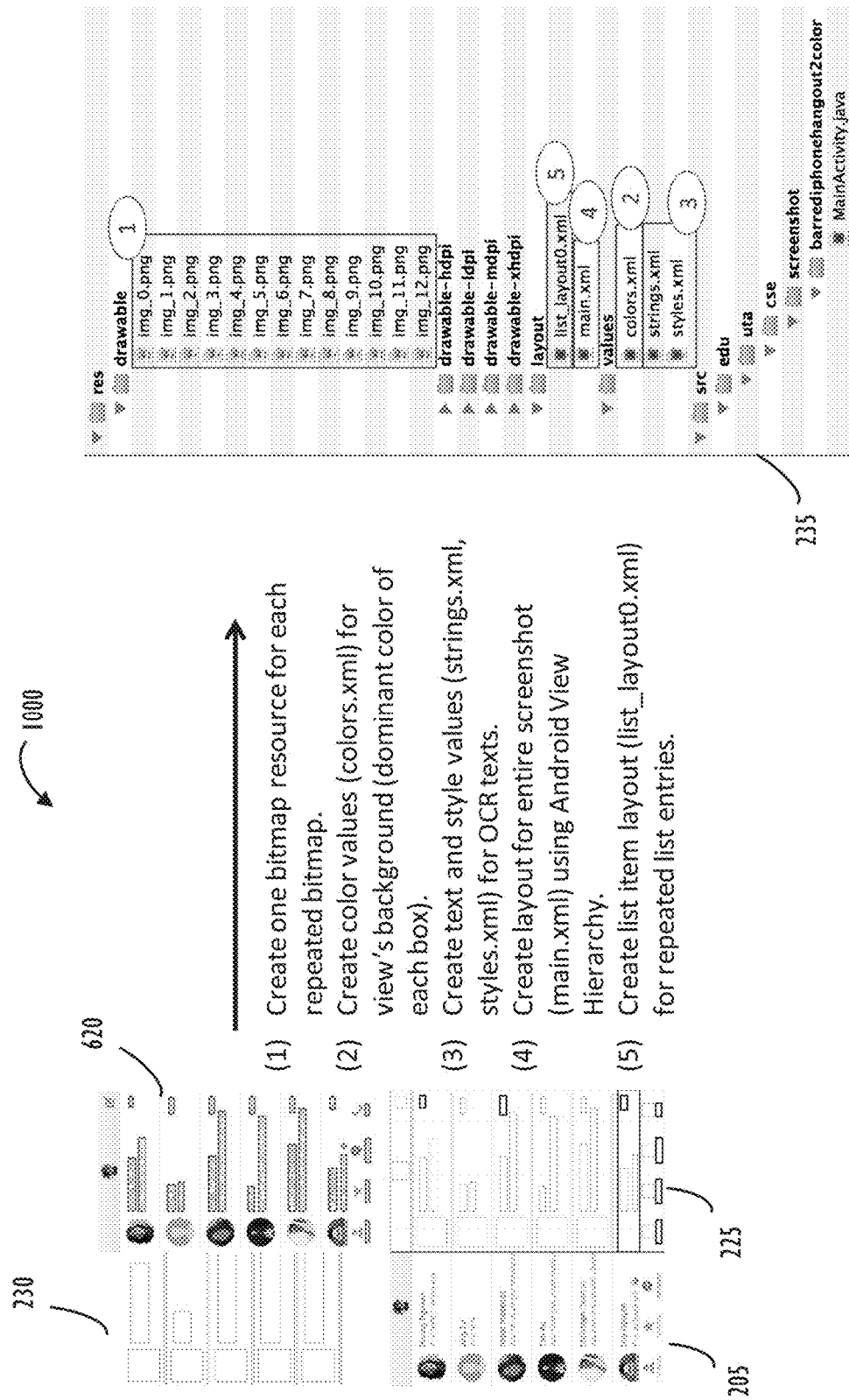
FIG. 10 illustrates a process for creating a development project with source code and resource files, in order to generate an application having a GUI that mimics an original input graphical representation, according to some disclosed embodiments.

Referring now to FIG. 10, diagram 1000 illustrates a process of creating (exporting results as) an ANDROID® project directory, including source code and resource files. This directory can be compiled with standard ANDROID® integrated development environments (IDEs). The inputs for the process of FIG. 10 are images 230, 620, 205 and 225, and the output is element 235. As illustrated in element 235 a group of bitmap resources is created, with only one bitmap resource created for each repeated bitmap. Specifically, each identified image is cropped and extracted from the input screenshot (image 205), only once for repeated images. Color values are created and used to populate the color definition file colors.xml for defining each view's background color. To provide a reasonable background color, the dominant color of each view, after extracting all identified images from the view, is used as the background color. The text definition file strings.xml and the style values definition file styles.xml are created; all detected text content and format are exported to these files, respectively. A layout of the entire screen is generated into the file main.xml using the ANDROID® view hierarchy (image 225) information. A list item layout definition file list_layout0.xml is created for items identified during the creation of image 230. JAVA® code is generated to fill lists with the identified entries at runtime. The resulting ANDROID® project 235 (an instance of an ANDROID® application in an IDE) may then be compiled to produce a functional executable application having a GUI that closely resembles the original input graphical representation 205, as shown at element 240 in FIG. 2. Again, as mentioned, ANDROID® is used here as merely one example, as the instant disclosure is applicable to various target OSs, the necessary changes being made, as would be appreciated by one of ordinary skill in the art.

While an overall process has been described with reference to FIGS. 1-10, it will be appreciated that intermediate results (results achieved at intermediate stages of the overall process) are still useful, for example, for generating a UI, or code therefore, whether in part or whole, and whether as refined as the final output shown in element 240 (FIG. 2) or not. Intermediate results may also be usefully applied and employed in other ways.

Figure 12:
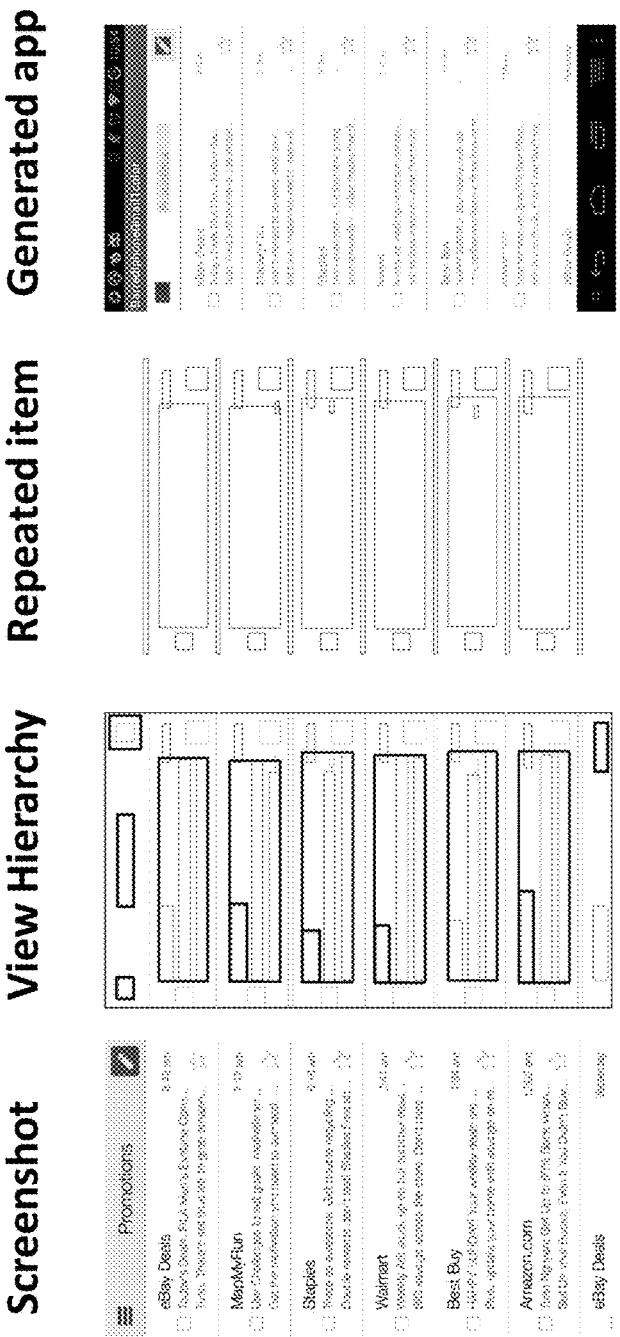
FIGS. 12 and 13 illustrate the disclosed application generation process as applied to different input graphical representations and different target OSs, showing some stages of the process, according to some disclosed embodiments.
Figure 13:
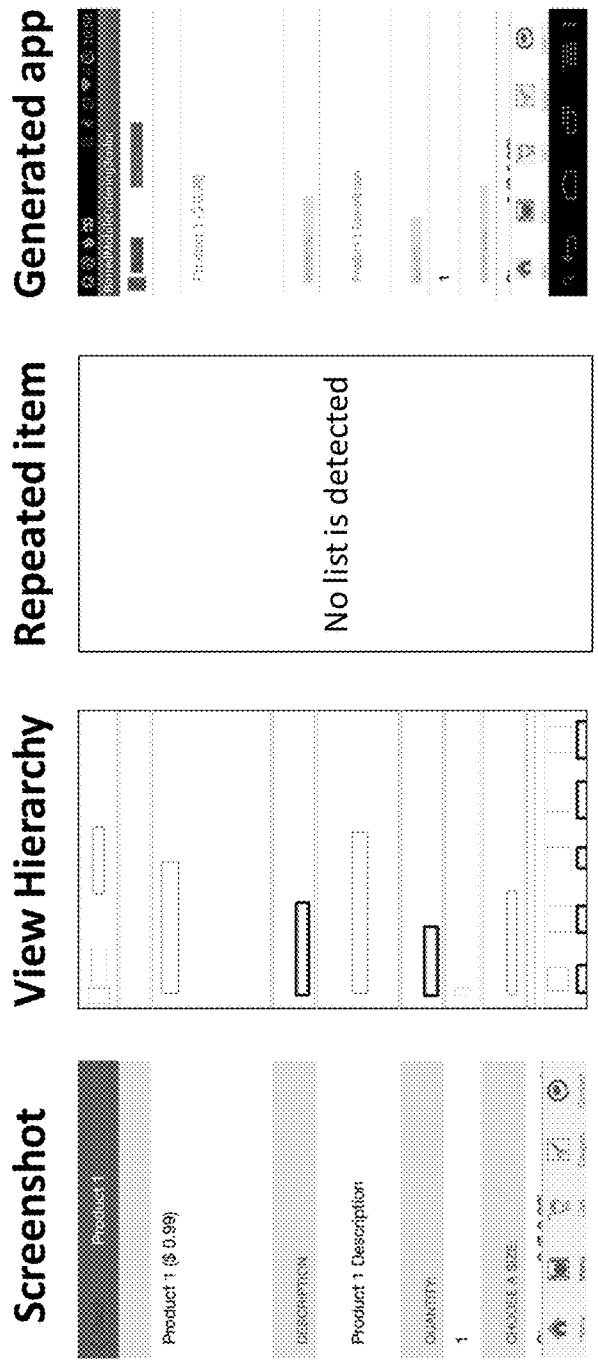

FIGS. 12 and 13 illustrate examples of generating a GUI starting from different input graphical representations, and for a target OS other than ANDROID®. These figures illustrate merely a few steps of the overall process set forth in FIGS. 1-10. In both FIGS. 12 and 13 IOS® is the target OS. In each figure, a few different stages of the overall process are shown, in order of progression of the process, from left to right in the figure. Thus, each figure illustrates the initial input graphical representation (here, a screenshot), analogous to image 205 of FIG. 2, as an initial stage of the overall process, shown at the left side of the figure; a view hierarchy of vision boxes, as a subsequent stage, shown to the immediate right thereof; an image in which repeated items have been identified (or, if there are none, not identified, as the case may be), as a subsequent stage, shown next moving rightward in the figure; and the generated GUI in an application running on the mobile device, analogous to image 240 of FIG. 2, as the final stage of the overall process, shown at the far right side of the figure. In FIG. 12 the initial input graphical representation is a screenshot of a Gmail app; in FIG. 13 the initial input graphical representation is a screenshot of a Sample app. In the screenshot of FIG. 12, repeated items are detected (the repeated email messages), while in the screenshot of FIG. 13 no repeated items, hence no lists, are detected. FIGS. 12 and 13 are arbitrary examples, and embodiments disclosed herein are applicable to other kinds of applications and other OSs.

According to some embodiments, each initial input graphical representation is converted to a separate application. However, according to some embodiments, it is also possible, using a graphical notation, to connect several initial input graphical representations, and to generate a single application with various screens corresponding to the several initial representations and with appropriate transitions between screens.

According to some embodiments, the process described herein is performed on a variety of initial graphical representations (e.g., screenshots) and the results are stored. Then an index of this screenshot corpus is created. A query interface to the index is provided that allows a user to search for screenshots by their structure, features, code, etc.

According to some embodiments, as the OCR engine for performing the OCR processing, the open source engine Tesseract and Tesseract's default version 3.0.2 English language data trained model may be employed. Tesseract's fastest mode2 with fully automatic page segmentation may be used. Tesseract's options for training its classifiers need not be used. According to some embodiments, other OCR engines, versions, models, modes, features, options and the like may be used.

According to some embodiments, as the computer vision system for performing the computer vision processing, the open source engine OpenCV in its default configuration, without training, may be used. According to some embodiments, other CV tools, configurations, and the like may be used.

Example platforms on which generated applications having a GUI are run include a 16 GB RAM 2.6 GHz Core i7 MACBOOK PRO® running OS X® 10.10.2, a 2 GB RAM GOOGLE® NEXUS 5® phone running ANDROID® 4.4.4. and a 1 GB RAM IPHONE® 5 phone running IOS® 7.1.2. Other platforms (devices, OSs, etc.) may be used.

Additional details applicable to embodiments disclosed herein may be found in the article "Reverse Engineering Mobile Application User Interfaces With REMAUI" by the instant inventors, to be published as part of the proceedings of the 30th IEEE/ACM International Conference on Automated Software Engineering (ASE 2015), to be held on Nov. 9-13, 2015, which article is hereby incorporated herein by reference in its entirety.

Figure 11:
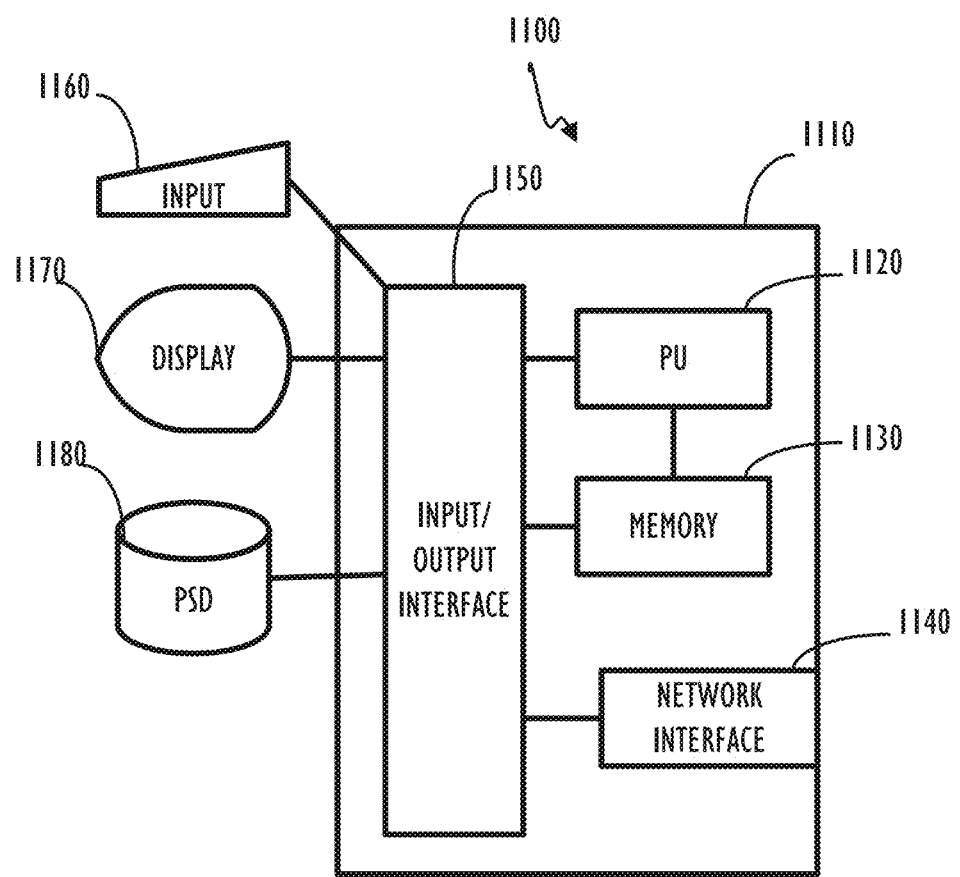
FIG. 11 illustrates a block diagram of a processing system that may be used to practice the disclosed application generation process, according to some disclosed embodiments.

Turning now to FIG. 11, possible internals and peripheral components of an example device 1100, which may be used to practice the disclosed GUI/application/software code generation techniques, are shown. Example device 1100 comprises a programmable control device 1110 which may be optionally connected to input 1160 (e.g., keyboard, mouse, touch screen, etc.), display 1170, and/or program storage device 1180. Also, included with programmable control device 1110 is a network interface 1140 for communication via a network with other computers and infrastructure devices (not shown). Note network interface 1140 may be included within programmable control device 1110 or be external to programmable control device 1110. In either case, programmable control device 1110 may be communicatively coupled to network interface 1140. Also, note program storage device 1180 represents any form of non-volatile storage including, but not limited to, all forms of optical and magnetic storage elements including solid-state storage.

Program control device 1110 may be included in a device 1100 and be programmed to perform methods in accordance with this disclosure (e.g., those illustrated in FIGS. 1-10). Program control device 1110 comprises a processor unit (PU) 1120, input-output (I/O) interface 1150 and memory 1130. Processing unit 1120 may include any programmable controller device including, for example, the INTEL CORE®, PENTIUM® and CELERON® processor families from Intel and the CORTEX® and ARM® processor families from ARM®. ("INTEL," "CORE," "PENTIUM," and "CELERON" are registered trademarks of the Intel Corporation. "CORTEX and "ARM" are registered trademarks of the ARM Limited Corporation.) Memory 1130 may include one or more memory modules and comprise random access memory (RAM), read only memory (ROM), programmable read only memory (PROM), programmable read-write memory, and solid state memory. One of ordinary skill in the art will also recognize that PU 1120 may also include some internal memory including, for example, cache memory.

Various changes in the materials, components, circuit elements, as well as in the details of the illustrated operational methods are possible without departing from the scope of the following claims. For instance, acts in accordance with FIGS. 1-10 may be performed by a programmable control device executing instructions organized into one or more modules (comprised of computer program code or instructions). Such modules may include all or part of a UI generation component, discussed below. A programmable control device may be a single computer processor (e.g., PU 1120), a plurality of computer processors coupled by a communications link or one or more special purpose processors (e.g., a digital signal processor, DSP). Such a programmable control device may be one element in a larger data processing system such as a general purpose computer system. Storage media, as embodied in storage devices such as 1180 and memory internal to program control device 1110, are suitable for tangibly embodying computer program instructions. Storage media may include, but not be limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices. These types of storage media are also sometimes referred to as computer readable media or program storage devices.

Systems and devices for performing the disclosed methods, processes and operations may of course include suitable equipment for the same, as will be understood by one of ordinary skill in the art from the description provided herein. For example, an OCR engine and a computer vision system may employ various appropriate optical and other equipment. Again, as already discussed, facilities for software development, such as an IDE, compiler, etc., may be included in/together with systems and devices described herein. Such equipment and facilities may be appropriately combined with a system such as represented by FIG. 11, either as component(s) external thereto but appropriately coupled thereto (communicatively and otherwise) or combined therewith into a single integral system or device. Such equipment and facilities may be included in a UI generation component, discussed below.

After reading the description presented herein, it will become apparent to a person skilled in the relevant arts how to implement embodiments disclosed herein using systems/architectures other than those described herein.

In view of the description provided thus far, the following section presents succinct descriptions of embodiments described hereinabove. These descriptions do not necessarily rehearse every aspect/feature/etc. described above.

According to disclosed embodiments, a first method includes: performing a computer vision (CV) process on a graphical representation of an initial user interface (UI) to yield a CV output; performing an optical character recognition (OCR) process on the graphical representation of the initial UI to yield an OCR output; and merging the CV output and the OCR output to yield a merge output. The merge output includes a view hierarchy representing a structure of a final UI that conforms to the graphical representation of the initial UI.

According to the first method, the graphical representation of the initial UI may be (i) a screenshot or (ii) a graphical rendering containing content drawn manually or using a computer design tool.

The first method may further include: identifying repeated elements in the graphical representation of the initial UI, wherein the repeated elements are determined to be scrollable lists.

The first method may further include: merging words identified by the OCR process and lines of text identified by the OCR process to generate text boxes, each text box containing a respective group of words.

The first method may further include: applying heuristics to identified UI elements to refine the view hierarchy, wherein the identified UI elements are candidate words identified by the OCR process and/or vision boxes generated by the CV process.

The first method may further include: refining the merge output; generating source code from the refined merge output; and generating an application from the source code, the application having the final UI that conforms to the graphical representation of the initial UI.

The first method may further include: running, on a device comprising a display, an application generated from source code based on the merge output, wherein the application includes the final UI that conforms to the graphical representation of the initial UI, such that the final UI that conforms to the graphical representation of the initial UI is generated on the display of the device.

According to disclosed embodiments, a second method includes: identifying candidate atomic UI elements in a graphical representation of an initial UI; identifying candidate text in the graphical representation of the initial UI; and merging the identified candidate atomic UI elements and the identified candidate text to yield a merge output, wherein the merge output comprises a view hierarchy representing a structure of a final UI that conforms to the graphical representation of the initial UI.

In the following, the "merge output" refers to the merge output of the second method.

According to the second method, the graphical representation of the initial UI may be (i) a screenshot or (ii) a graphical rendering containing content drawn manually or using a computer design tool.

The second method may further include: identifying repeated elements in the graphical representation of the initial UI, wherein the repeated elements are determined to be scrollable lists.

The second method may further include: merging words of the candidate text and lines of text of the candidate text to generate text boxes, each text box containing a respective group of words.

The second method may further include: applying heuristics to identified UI elements to refine the view hierarchy, wherein the identified UI elements are candidate words and/or vision boxes.

The second method may further include: refining the merge output; generating source code from the refined merge output; and generating an application from the source code, the application having the final UI that conforms to the graphical representation of the initial UI.

The second method may further include: running, on a device comprising a display, an application generated from source code based on the merge output, wherein the application comprises the final UI that conforms to the graphical representation of the initial UI, such that the final UI that conforms to the graphical representation of the initial UI is generated on the display of the device.

According to disclosed embodiments, a computer system includes: a CV component configured for identifying atomic UI elements in a graphical representation of an initial UI; an OCR component configured for identifying text in the graphical representation of the initial UI; and a UI generation component configured for merging identified candidate text and vision boxes associated with identified atomic UI elements to produce a merge output. The merge output comprises a view hierarchy representing a structure of a final UI that conforms to the graphical representation of the initial UI.

In the following, the "merge output" refers to the merge output of the computer system.

With regard to the computer system, the graphical representation of the initial UI may be (i) a screenshot or (ii) a graphical rendering containing content drawn manually or using a computer design tool.

In the computer system, the UI generation component may be further configured to: identify repeated elements in the graphical representation of the initial UI, wherein the repeated elements are determined to be scrollable lists.

In the computer system, the UI generation component may be further configured to: merge words identified by the OCR component and lines of text identified by the OCR component to generate text boxes, each text box containing a respective group of words.

In the computer system, the UI generation component may be further configured to: apply heuristics to identified UI elements to refine the view hierarchy, wherein the identified UI elements are candidate words identified by the OCR component and/or vision boxes generated by the CV component.

In the computer system, the UI generation component may be further configured to: refine the merge output; generate source code from the refined merge output; and generate an application from the source code, the application having the final UI that conforms to the graphical representation of the initial UI.

According to disclosed embodiments, computer-readable media comprise instructions for causing a processor-based device to perform any and all variations of the first and second methods described above.

With regard to the above first and second methods, computer system and computer-readable media, the following descriptions also apply, as applicable.

The CV output may include vision boxes (bounding boxes), and the OCR output may include text, including words and lines of text. "Words" may refer to candidate words, which may be subject to further processing/refinement to identify valid and invalid words.

In addition to the identification of candidate atomic UI elements, bounding boxes for the candidate atomic UI elements may be created.

The heuristics may serve to remove or filter candidate words not likely to reflect valid words. The heuristics may also serve to effect other refinements of the merge output or of subsequent refinements thereof.

Appropriate source code may be generated such that the application generated therefrom may run on any of various platforms, such as mobile and non-mobile platforms, and on any of various operating systems, such as ANDROID®, IOS®, and others.

In light of the principles and example embodiments described and illustrated herein, it will be recognized that the example embodiments can be modified in arrangement and detail without departing from such principles. Also, the foregoing discussion has focused on particular embodiments, but other configurations are also contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments. As a rule, any embodiment referenced herein is freely combinable with any one or more of the other embodiments referenced herein, and any number of features of different embodiments are combinable with one another, unless indicated otherwise.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, and processes in which the individual operations disclosed herein are combined, subdivided, rearranged, or otherwise altered.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention. What is claimed as the invention, therefore, are all implementations that come within the scope of the following claims, and all equivalents to such implementations.

What is claimed is:

1. A method for at least partially automating the generation of a user interface for a mobile application, the method comprising:

performing computer vision processing on an original graphical representation of a proposed user interface, identifying atomic elements within the original graphical representation, and generating a view hierarchy image having one bounding box for each atomic element;

performing optical character recognition on the original graphical representation, identifying words and lines of text within the original graphical representation, and generating a first word image comprising one bounding box per word and a second word image comprising one bounding box per line;

merging the view hierarchy image and the first word image, removing words that conflict with the bounding boxes of the view hierarchy image, and generating a modified first word image;

merging words from the modified first word image and lines from the second word image into text blocks, grouping words that belong together, splitting words that do not belong together, and generating a third word image comprising one bounding box per valid word;

merging the original graphical representation with the third word image and generating a modified graphical representation comprising text boxes and images;

merging the modified graphical representation with the view hierarchy image and generating a modified view hierarchy image that comprises the text boxes and unknown vision boxes;

traversing a vision box hierarchy of the modified view hierarchy image and generating an OS-specific view hierarchy image that comprises image views, text views, and container views;

determining if there are repeated items in the OS-specific view hierarchy image, creating a list view for any repeated items in the OS-specific view hierarchy image, and generating a modified OS-specific view hierarchy image comprising list view items; and using at least the modified graphical representation and the modified OS-specific view hierarchy image as an input and generating an OS-specific project directory that comprises OS-specific source code and resource files, wherein the OS-specific project directory is capable of being compiled to produce an OS-specific functional executable application having a graphical user interface that emulates the original graphical representation.

2. The method of claim 1, wherein performing computer vision processing comprises applying an edge detection algorithm to the graphical representation and generating an edge detection image.

3. The method of claim 2, wherein performing computer vision processing further comprises performing image dilation on the edge detection image and obtaining a dilation image.

4. The method of claim 3, wherein performing computer vision processing further comprises computing contours of dilated edges within the dilation image and generating a contour image.

5. The method of claim 4, wherein performing computer vision processing further comprises computing a bounding box for each atomic element of the contour image and generating the view hierarchy image.

6. The method of claim 1, wherein performing optical character recognition comprises removing candidate words that are non-text elements.

7. The method of claim 1, wherein merging the view hierarchy image and the first word image comprises applying a merge filter that removes identified words that do not fit within or do not fill corresponding bounding boxes of the view hierarchy image.

8. The method of claim 1, wherein merging words from the modified first word image and lines from the second word image comprises splitting words if a distance between the words exceeds a threshold.

9. The method of claim 1, wherein merging the modified graphical representation with the view hierarchy image comprises traversing a vision box hierarchy of the view hierarchy image from leaf node to parent node.

10. The method of claim 9, wherein merging the modified graphical representation with the view hierarchy image further comprises determining as to each node if a bounding box associated with the node overlaps a text box and, if so, designating the node as a vision box.

11. The method of claim 1, wherein traversing a vision box hierarchy of the modified view hierarchy image comprises removing small vision boxes that represent noise, designating vision boxes that have large children nodes as container views, placing vision boxes that contain a text box into a text view of the view hierarchy, and designating vision boxes that do not satisfy those criteria as image boxes.

12. The method of claim 1, wherein generating an OS-specific project directory comprises creating a group of bitmap resources.

13. The method of claim 12, wherein generating an OS-specific project directory further comprises creating a text definition file and a style values definition file and exporting detected text content and format content to the files, respectively.

14. The method of claim 13, wherein generating an OS-specific project directory further comprises creating a layout of a screen of the graphical using the OS-specific view hierarchy image.

15. The method of claim 13, wherein generating an OS-specific project directory further comprises creating a list item layout definition file for items identified during generation of the modified OS-specific view hierarchy image.

16. The method of claim 14, wherein generating an OS-specific project directory further comprises creating code and filling lists with the identified items at runtime.

17. A system comprising:
a processor configured with instructions to:
perform computer vision processing on an original graphical representation of a proposed user interface to identify atomic elements within the original graphical representation and to generate a view hierarchy image having one bounding box for each atomic element;

perform optical character recognition on the original graphical representation to identify words and lines of text within the original graphical representation and to generate a first word image comprising one bounding box per word and a second word image comprising one bounding box per line;

merge the view hierarchy image and the first word image to remove identified words that conflict with the bounding boxes of the view hierarchy image and to generate a modified first word image;

merge words from the modified first word image and lines from the second word image into text blocks to group words that belong together and split words that do not belong together and to generate a third word image comprising one bounding box per valid word;

merge the original graphical representation with the third word image to generate a modified graphical representation comprising text boxes and images;

merge the modified graphical representation with the view hierarchy image to generate a modified view hierarchy image that comprises the text boxes and unknown vision boxes;

traverse a vision box hierarchy of the modified view hierarchy image to generate an OS-specific view hierarchy image that comprises image views, text views, and container views;

if there are repeated items in the OS-specific view hierarchy image, create a list view for the repeated items to generate a modified OS-specific view hierarchy image comprising list view items; and use at least the modified graphical representation and the modified OS-specific view hierarchy image as an input and generating an OS-specific project directory that comprises OS-specific source code and resource files, wherein the OS-specific project directory is capable of being compiled to produce an OS-specific functional executable application having a graphical user interface that resembles the original graphical representation.

18. The system of claim 17, wherein the instructions to perform computer vision processing comprise instructions to apply an edge detection algorithm to the graphical representation to generate an edge detection image.

19. The system of claim 18, wherein the instructions to perform computer vision processing comprise instructions to perform image dilation on the edge detection image to obtain a dilation image.

20. The system of claim 19, wherein the instructions to perform computer vision processing comprise instructions to compute contours of dilated edges within the dilation image to generate a contour image.

21. The system of claim 20, wherein the instructions to perform computer vision processing comprise instructions to compute a bounding box for each atomic element of the contour image to generate the view hierarchy image.

22. The system of claim 17, wherein the instructions to perform optical character recognition comprise instructions to remove candidate words that are non-text elements.

23. The system of claim 17, wherein the instructions to merge the view hierarchy image and the first word image comprise instructions to apply a merge filter that removes identified words that do not fit within or do not fill corresponding bounding boxes of the view hierarchy image.

24. The system of claim 17, wherein the instructions to merge words from the modified first word image and lines from the second word image comprise instructions to split words if a distance between the words exceeds a threshold.

25. The system of claim 17, wherein the instructions to merge the modified graphical representation with the view hierarchy image comprise instructions to traverse a vision box hierarchy of the view hierarchy image from leaf node to parent node.

26. The system of claim 25, wherein the instructions to merge the modified graphical representation with the view hierarchy image comprise instructions to determine as to each node if a bounding box associated with the node overlaps a text box and, if so, designate the node as a vision box.

27. The system of claim 17, wherein the instructions to traverse a vision box hierarchy of the modified view hierarchy image comprise instructions to remove small vision boxes that represent noise, designate vision boxes that have large children nodes as container views, place vision boxes that contain a text box into a text view of the view hierarchy, and designate vision boxes that do not satisfy those criteria as image boxes.

28. The system of claim 17, wherein the instructions to generate an OS-specific project directory comprise instructions to create a group of bitmap resources.

29. The system of claim 28, wherein the instructions to generate an OS-specific project directory comprise instructions to create a text definition file and a style values definition file and export detected text content and format content to the files, respectively.

30. The system of claim 29, wherein the instructions to generate an OS-specific project directory comprise instructions to create a layout of a screen of the graphical using the OS-specific view hierarchy image.

31. The system of claim 29, wherein the instructions to generate an OS-specific project directory comprise instructions to create a list item layout definition file for items identified during generation of the modified OS-specific view hierarchy image.

32. The system of claim 30, wherein the instructions to generate an OS-specific project directory comprise instructions to create code to fill lists with the identified items at runtime.

* * * * *